(12) United States Patent
Miyazaki et al.

(10) Patent No.: US 10,408,349 B2
(45) Date of Patent: Sep. 10, 2019

(54) SEAL RING

(71) Applicant: NOK CORPORATION, Tokyo (JP)

(72) Inventors: Maiko Miyazaki, Fujisawa (JP); Yohei Sakai, Fujisawa (JP); Kenichi Yoshimura, Fujisawa (JP); Shota Toma, Fujisawa (JP)

(73) Assignee: NOK CORPORATION, Tokyo (JP)

( * ) Notice: Subject to any disclaimer, the term of this patent is extended or adjusted under 35 U.S.C. 154(b) by 56 days.

(21) Appl. No.: 15/557,955

(22) PCT Filed: Mar. 11, 2016

(86) PCT No.: PCT/JP2016/057718
§ 371 (c)(1),
(2) Date: Sep. 13, 2017

(87) PCT Pub. No.: WO2016/148048
PCT Pub. Date: Sep. 22, 2016

(65) Prior Publication Data
US 2018/0058584 A1    Mar. 1, 2018

(30) Foreign Application Priority Data

Mar. 16, 2015  (JP) ................................. 2015-052587
Mar. 16, 2015  (JP) ................................. 2015-052676

(51) Int. Cl.
*F16J 15/12*  (2006.01)
*F16J 15/16*  (2006.01)
(Continued)

(52) U.S. Cl.
CPC ......... *F16J 15/164* (2013.01); *F16J 15/3272* (2013.01); *F16J 15/441* (2013.01)

(58) Field of Classification Search
CPC ...... F16J 15/164; F16J 15/3272; F16J 15/441; F16J 15/3244
See application file for complete search history.

(56) References Cited

U.S. PATENT DOCUMENTS 4,082,296 A * 4/1978 Stein .................... F16J 15/3412
                                                       277/400
5,169,159 A * 12/1992 Pope ..................... F16J 15/441
                                                       277/422
(Continued)

FOREIGN PATENT DOCUMENTS

CN    102483162 A    5/2012
CN    102619742 A    8/2012
(Continued)

OTHER PUBLICATIONS

Extended European Search Report dated Oct. 18, 2018 (corresponding to EP16764878.1).

(Continued)

*Primary Examiner* — Eugene G Byrd
(74) *Attorney, Agent, or Firm* — Harness, Dickey & Pierce, P.L.C.

(57) ABSTRACT

A seal ring includes, on a side of a sliding surface thereof, a groove part (120) having a first groove (121) extending in a circumferential direction thereof and a second groove (122) extending from a central position of the first groove (121) in the circumferential direction to an inner peripheral surface and guiding sealed fluid into the first groove (121), the first groove (121) having dynamic pressure generation grooves (121*a*) configured to have a groove bottom made shallower at an end thereof in the circumferential direction than at a center thereof in the circumferential direction, and a foreign matter catching groove (121*b*) that has a groove bottom deeper than the groove bottoms of the dynamic pressure generation grooves (121*a*) and is capable of catching foreign matter, and the first groove (121) being provided at a position that falls within a sliding region in which the seal ring slides on the lateral wall surface.

3 Claims, 24 Drawing Sheets

(51) Int. Cl.
*F16J 15/3272* (2016.01)
*F16J 15/44* (2006.01)

(56) References Cited

U.S. PATENT DOCUMENTS

| | | | |
|---|---|---|---|
| 5,171,027 A * | 12/1992 | Domkowski | F16H 57/08 |
| | | | 277/388 |
| 5,328,178 A * | 7/1994 | Nies | B60T 11/236 |
| | | | 277/438 |
| 2012/0018957 A1 | 1/2012 | Watanabe | |
| 2014/0008876 A1* | 1/2014 | Nagai | F16J 15/441 |
| | | | 277/579 |
| 2016/0186862 A1 | 6/2016 | Kondou et al. | |
| 2016/0238134 A1* | 8/2016 | Ohya | F16J 15/441 |
| 2017/0009889 A1 | 1/2017 | Seki et al. | |
| 2018/0051809 A1* | 2/2018 | Yoshida | F16J 15/18 |

FOREIGN PATENT DOCUMENTS

| | | | | |
|---|---|---|---|---|
| DE | 19713455 A1 | | 10/1998 | |
| JP | H08121603 A | | 5/1996 | |
| JP | 09210211 A | * | 8/1997 | ............. F16J 15/441 |
| JP | 2002276815 A | | 9/2002 | |
| JP | 2006009897 A | * | 1/2006 | ............. F16J 15/324 |
| JP | 2007078041 A | * | 3/2007 | ................. F16J 9/14 |
| JP | 2014055645 A | * | 3/2014 | ........... F16J 15/3272 |
| JP | 2015028382 A | | 2/2015 | |
| JP | 2018087641 A | * | 6/2018 | ............. F16J 15/164 |
| WO | 2011105513 A1 | | 9/2011 | |
| WO | 2015/111707 A1 | | 7/2015 | |

OTHER PUBLICATIONS

Chinese Office Action dated Jun. 4, 2018 with English translation (corresponding to CN 201680014654.7).

* cited by examiner

SEAL RING

CROSS-REFERENCE TO RELATED APPLICATIONS

This application is a National Stage of International Application No. PCT/JP2016/057718, filed Mar. 11, 2016 (now WO 2018/0058584A1), which claims priority to Japanese Application No. 2015-052587, filed Mar. 16, 2015 and Japanese Application No. 2015-052676, filed Mar. 16, 2015. The entire disclosures of each of the above applications are incorporated herein by reference.

FIELD

The present disclosure relates to a seal ring that seals the annular gap between a shaft and the shaft hole of a housing.

BACKGROUND

An Automatic Transmission (AT), a Continuously Variable Transmission (CVT) or the like for an automobile is provided with a seal ring that seals the annular gap between a shaft and a housing that rotate relative to each other, to maintain hydraulic pressure. In recent years, an increase in fuel efficiency has been propelled as countermeasures for environmental issues, and there has been an increased demand for reducing a rotational torque in the above seal ring. In view of this, technology for providing a groove that guides sealed fluid to the side of the sliding surface of a seal ring to generate dynamic pressure has been known (see PTL 1). In such technology, however, when sealed fluid contains foreign matter, there is a possibility that the effect of reducing a rotational torque is not sufficiently exhibited with a reduction in dynamic pressure effect and that sealing performance reduces with the acceleration of wear-out as a result of the foreign matter being put in the groove.

In addition, there has been known technology for providing a groove, through which the side of an inner peripheral surface and the side of an outer peripheral surface communicate with each other, on the side of the sliding surface of a seal ring to remove foreign matter from the sliding surface of the seal ring (see PTL 2). In such technology, however, sealed fluid leaks from a groove. Therefore, there is a possibility that a leakage amount increases.

CITATION LIST

Patent Literature

[PTL 1] Japanese Patent Application Laid-open No. H08-121603
[PTL 2] Japanese Patent Application Laid-open No. 2002-276815

SUMMARY

Technical Problem

It is an object of the present disclosure to provide a seal ring capable of stably reducing a rotational torque while preventing the leakage of sealed fluid.

Solution to Problem

The present disclosure employs the following solution to solve the above problem.

That is, the present disclosure provides a seal ring that is attached to an annular groove provided on an outer periphery of a shaft and seals an annular gap between the shaft and a housing that rotate relative to each other, to maintain fluid pressure in a sealed region in which the fluid pressure is configured to change, the seal ring sliding on a lateral wall surface of the annular groove on a lower pressure side, the seal ring including, on a side of a sliding surface thereof that slides on the lateral wall surface, a groove part having a first groove extending in a circumferential direction thereof and a second groove extending from a central position of the first groove in the circumferential direction to an inner peripheral surface and guiding sealed fluid into the first groove, the first groove having dynamic pressure generation grooves configured to have a groove bottom made shallower at an end thereof in the circumferential direction than at a center thereof in the circumferential direction, and a foreign matter catching groove that has a groove bottom deeper than the groove bottoms of the dynamic pressure generation grooves and is capable of catching foreign matter, and the first groove being provided at a position that falls within a sliding region in which the seal ring slides on the lateral wall surface.

According to the present disclosure, sealed fluid is guided into the groove part. Therefore, in a range in which the groove part is provided, fluid pressure acting on the seal ring from a higher pressure side and fluid pressure acting on the seal ring from a lower pressure side cancel each other. Thus, the pressure receiving area of the seal ring to receive the fluid pressure can be reduced. In addition, when the seal ring slides on the lateral wall surface of the annular groove on the lower pressure side, the sealed fluid flows out from the dynamic pressure generation grooves to a sliding part to generate dynamic pressure. Thus, a force is generated in the seal ring in a direction away from the lateral wall surface. Further, since the dynamic pressure generation grooves are configured to have a groove bottom made shallower at their end in the circumferential direction than at their center in the circumferential direction, the above dynamic pressure can be effectively generated by a wedge effect. As described above, the reduction in the pressure receiving area and the generation of the force in the seal ring in the direction away from the lateral wall surface due to the dynamic pressure work together. Thus, it becomes possible to effectively reduce a rotational torque.

In addition, since foreign matter is caught by the foreign matter catching groove, the impairment of the dynamic pressure generation function of the dynamic pressure generation grooves due to the foreign matter is prevented. Moreover, since the first groove is provided at the position that falls within the sliding region in which the seal ring slides on the lateral wall surface, the leakage of the sealed fluid can be prevented.

In addition, the dynamic pressure generation grooves may be provided on both sides of a center in the circumferential direction of the first groove.

Thus, the dynamic pressure generation function of the dynamic pressure generation grooves can be exhibited regardless of the rotating direction of the seal ring relative to the shaft.

Here, the foreign matter catching groove may be provided over an entire region in the circumferential direction of the first groove.

In addition, a configuration in which the foreign matter catching groove is provided only at the center in the circumferential direction of the first groove can be employed.

The groove bottom of the foreign matter catching groove may be made gradually shallower toward the second groove.

Thus, foreign matter intruding from the second groove can be efficiently guided into the foreign matter catching groove, and the intrusion of the foreign matter into the dynamic pressure generation grooves can be prevented.

The dynamic pressure generation grooves may be provided to have a width in a radial direction expanded toward the end thereof in the circumferential direction.

Thus, a width in the radial direction of the sealed fluid flowing out from the dynamic pressure generation grooves to the sliding part can be widened.

A groove bottom of the second groove may be set to have a depth which is greater than the depth of the groove bottoms of the dynamic pressure generation grooves and at which foreign matter can be caught.

Thus, since the second groove also exhibits the function of catching foreign matter, the intrusion of the foreign matter into the dynamic pressure generation grooves can be prevented.

In addition, the present disclosure provides a seal ring that is attached to an annular groove provided on an outer periphery of a shaft and seals an annular gap between the shaft and a housing that rotate relative to each other, to maintain fluid pressure in a sealed region in which the fluid pressure is configured to change, the seal ring sliding on a lateral wall surface of the annular groove on a lower pressure side, the seal ring including, on a side of a sliding surface thereof that slides on the lateral wall surface, a first groove provided at a position that falls within a sliding region in which the seal ring slides on the lateral wall surface, and extending in a circumferential direction thereof, and a second groove extending from an inner peripheral surface to a position at which the second groove enters a central position of the first groove in the circumferential direction, guiding sealed fluid into the first groove, and capable of discharging foreign matter to a side of the inner peripheral surface, the first groove having a pair of dynamic pressure generation grooves configured to have a groove bottom made shallower at an end thereof in the circumferential direction than at a center thereof in the circumferential direction on both sides in the circumferential direction across a portion where the second groove enters, and the second groove being configured to have a groove bottom deeper than the groove bottoms of the dynamic pressure generation grooves.

According to the present disclosure, sealed fluid is guided into the first groove and the second groove provided on the side of the sliding surface of the seal ring. Therefore, in a range in which the first groove and the second groove are provided, fluid pressure acting on the seal ring from a higher pressure side and fluid pressure acting on the seal ring from a lower pressure side cancel each other. Thus, the pressure receiving area of the seal ring to receive the fluid pressure can be reduced. In addition, when the seal ring slides on the lateral wall surface of the annular groove on the lower pressure side, the sealed fluid flows out from the dynamic pressure generation grooves to the sliding part to generate dynamic pressure. Thus, a force is generated in the seal ring in a direction away from the lateral wall surface. Further, since the dynamic pressure generation grooves are configured to have a groove bottom made shallower at their end in the circumferential direction than at their center in the circumferential direction, the above dynamic pressure can be effectively generated by a wedge effect. As described above, the reduction in the pressure receiving area and the generation of the force in the seal ring in the direction away from the lateral wall surface due to the dynamic pressure work together. Thus, it becomes possible to effectively reduce a rotational torque. In addition, since the dynamic pressure generation grooves are provided on both sides in the circumferential direction across the portion where the second groove enters, the dynamic pressure generation grooves can exhibit a dynamic pressure generation function regardless of the rotating direction of the seal ring relative to the shaft. In addition, since the first groove is provided at the position that falls within the sliding region in which the seal ring slides on the lateral wall surface, the amount of the sealed fluid leaking from the first groove can be suppressed. Moreover, the second groove having the bottom deeper than the groove bottoms of the dynamic pressure generation grooves is provided. By the second groove, foreign matter intruding into the sliding part can be discharged to the side of the inner peripheral surface. Accordingly, the impairment of the dynamic pressure generation function of the dynamic pressure generation groove due to foreign matter is prevented.

A barrier part that prevents flow of the sealed fluid from flowing from one of the dynamic pressure generation grooves to the other of the dynamic pressure generation grooves may be provided between the pair of dynamic pressure generation grooves and on an outside in a radial direction of the second groove.

Thus, fluid flowing from one of the dynamic pressure generation grooves to the other of the dynamic pressure generation grooves is easily flowed by the barrier part to move to an inside in the radial direction of the second groove. Thus, foreign matter intruding into the sliding surface is actively discharged to the side of the inner peripheral surface of the seal ring.

The groove bottom of the second groove may be configured by a stepped surface having a groove depth made greater from the outside to an inside in the radial direction. In addition, the groove bottom of the second groove is suitably provided with an inclined surface having a groove depth made greater from the outside to an inside in the radial direction. By the employment of such a configuration, foreign matter intruding into the second groove is actively discharged to the side of the inner peripheral surface of the seal ring.

Advantageous Effects of the Disclosure

As described above, the present disclosure can stably reduce a

DRAWINGS

DETAILED DESCRIPTION

Hereinafter, with reference to the drawings, modes for carrying out the present disclosure will be illustratively described in detail based on embodiments and examples. However, dimensions, materials, shapes, their relative arrangements, or the like of constituents described in the embodiments and the examples do not intend to limit the scope of the present disclosure unless otherwise specifically described. Note that seal rings according to the embodiments and the examples are used to seal the annular gap between a shaft and a housing that rotate relative to each other, to maintain hydraulic pressure in a transmission such as an AV or a CVT for an automobile. In addition, in the following description, a "higher pressure side" indicates a side where pressure becomes higher when differential pressure is generated between both sides of the seal rings, whereas a "lower pressure side" indicates a side where pressure becomes lower when differential pressure is generated between both sides of the seal rings.

First Embodiment

Figure 1:
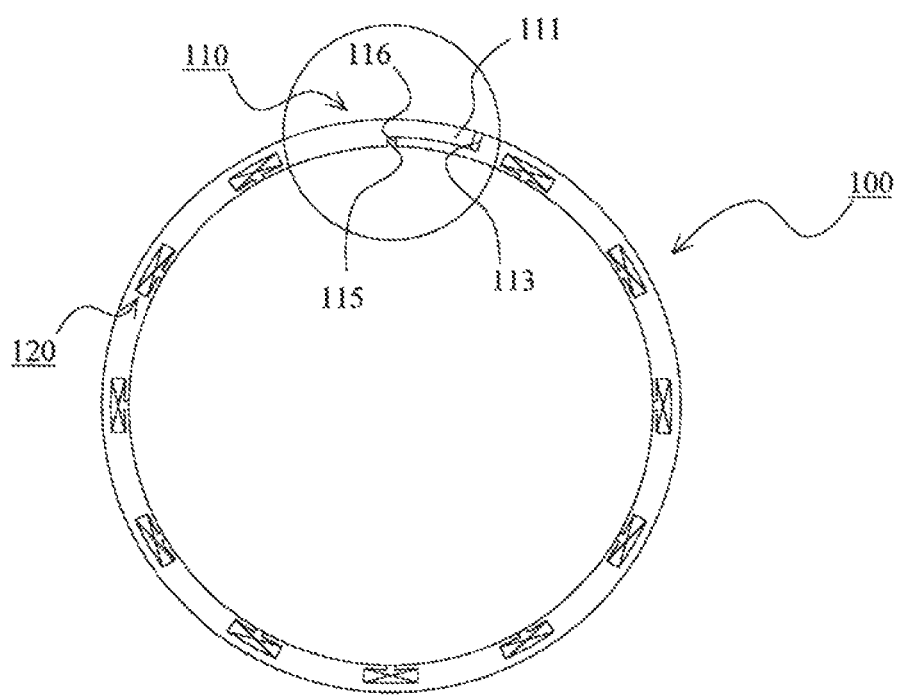
FIG. 1 is a side view of a seal ring according to a first embodiment of the present disclosure.
Figure 2:
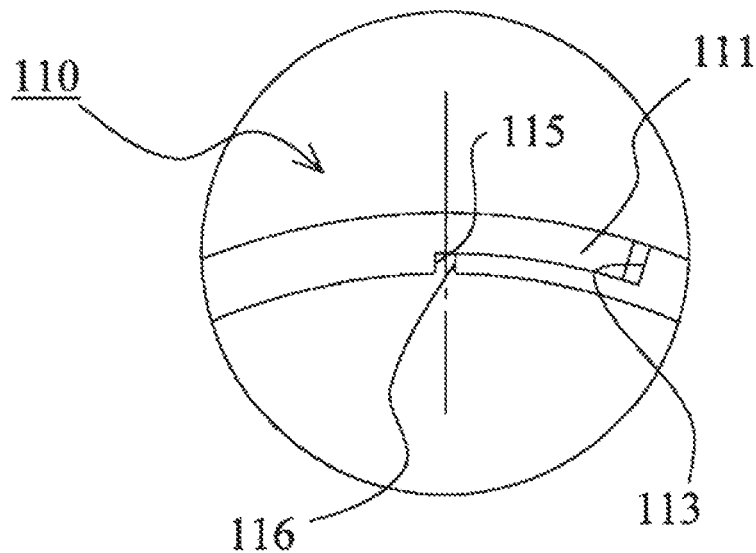
FIG. 2 is a partially enlarged view of the side view of the seal ring according to the first embodiment of the present disclosure.
Figure 3:
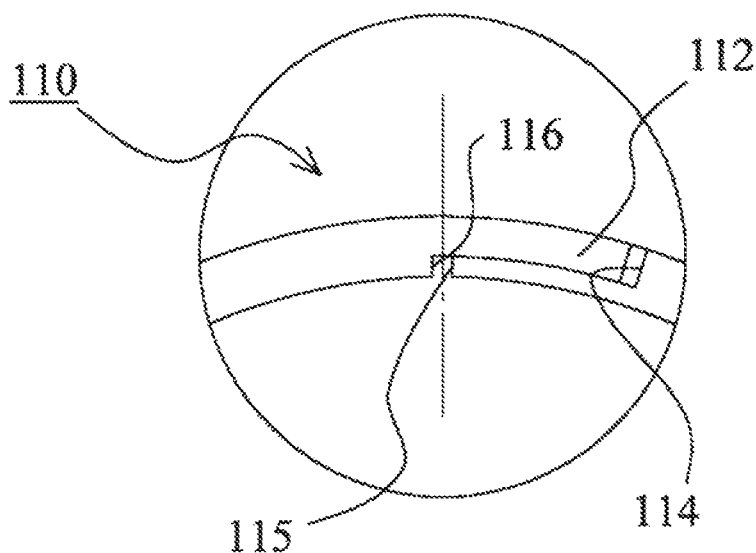
FIG. 3 is a partially enlarged view of the side view of the seal ring according to the first embodiment of the present disclosure.
Figure 4:
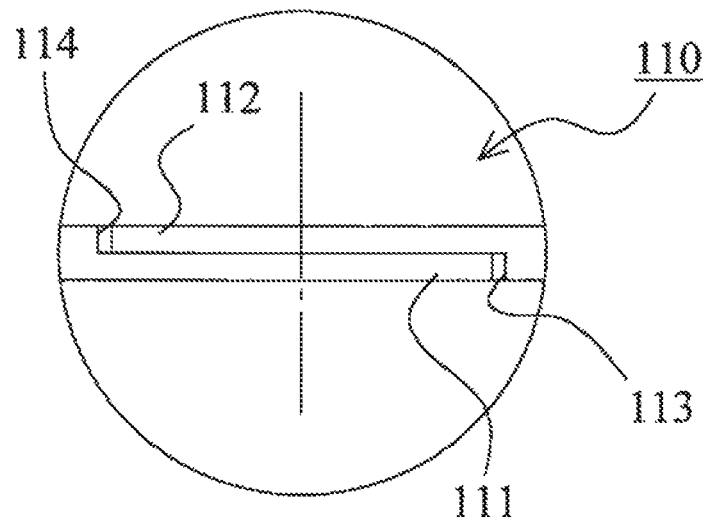
FIG. 4 is a partially enlarged view of the seal ring according to the first embodiment of the present disclosure when seen from the side of its outer peripheral surface.
Figure 5:
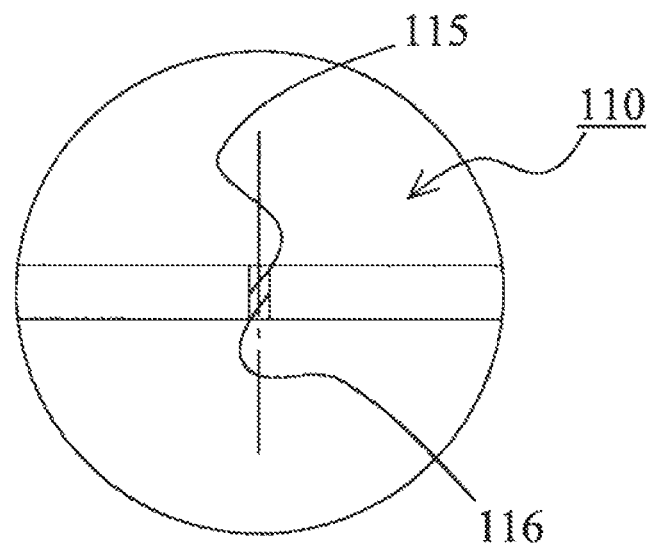
FIG. 5 is a partially enlarged view of the seal ring according to the first embodiment of the present disclosure when seen from the side of its inner peripheral surface.
Figure 6:
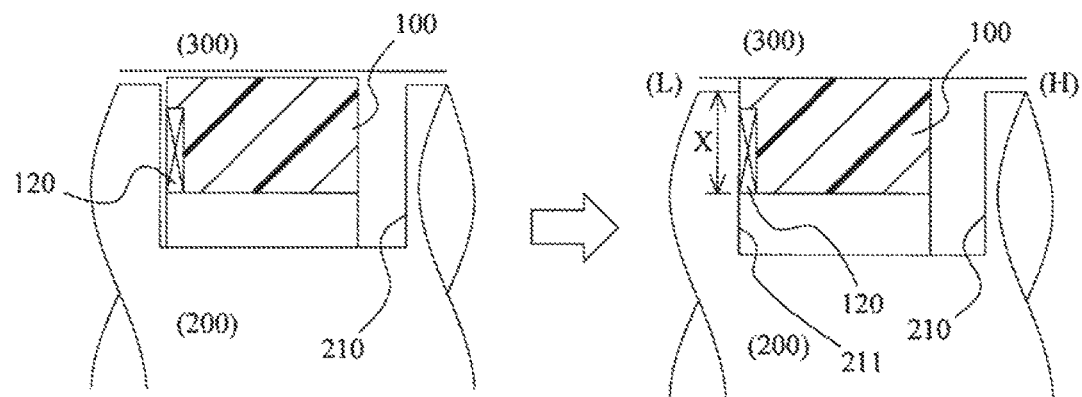
FIG. 6 is a schematic cross-sectional view showing a state in which the seal ring according to the first embodiment of the present disclosure is in use.

A seal ring according to a first embodiment of the present disclosure will be described with reference to FIGS. 1 to 6. FIG. 1 is a side view of the seal ring according to the first embodiment of the present disclosure. FIG. 2 is a partially enlarged view of the side view of the seal ring according to the first embodiment of the present disclosure in which a part surrounded by a circle in FIG. 1 is enlarged. FIG. 3 is a partially enlarged view of the side view of the seal ring according to the first embodiment of the present disclosure in which the part surrounded by the circle in FIG. 1 is seen from the opposite side of the seal ring. FIG. 4 is a partially enlarged view of the seal ring according to the first embodiment of the present disclosure when seen from the side of its outer peripheral surface in which the part surrounded by the circle in FIG. 1 is seen from the side of the outer peripheral surface. FIG. 5 is a partially enlarged view of the seal ring according to the first embodiment of the present disclosure when seen from the side of its inner peripheral surface in which the part surrounded by the circle in FIG. 1 is seen from the side of the inner peripheral surface. FIG. 6 is a schematic cross-sectional view showing a state in which the seal ring according to the first embodiment of the present disclosure is in use.

<Configuration of Seal Ring>

A seal ring 100 according to the present embodiment is attached to an annular groove 210 provided on the outer periphery of a shaft 200 and seals the annular gap between the shaft 200 and a housing 300 (the inner peripheral surface of a shaft hole in which the shaft 200 is to be inserted in the housing 300) that rotate relative to each other. Thus, the seal ring 100 maintains fluid pressure in a sealed region in which the fluid pressure (hydraulic pressure in the present embodiment) is configured to change. Here, in the present embodiment, fluid pressure in a region on the right side of the seal ring 100 in FIG. 6 is configured to change. Further, the seal ring 100 plays a role in maintaining the fluid pressure in the sealed region on the right side in the figure via the seal ring 100. Note that the fluid pressure in the sealed region is low and no load is generated when the engine of an automobile is stopped, whereas the fluid pressure in the sealed region becomes high when the engine is started. FIG. 6 shows a state in which no load is generated on its left side and a state in which differential pressure is generated (the fluid pressure in the sealed region becomes high) on its right side.

Further, the seal ring 100 is made of a resin material such as polyether ether ketone (PEEK), polyphenylenesulfide (PPS), and polytetrafluoroethylene (PTFE). In addition, the outer peripheral surface of the seal ring 100 is configured to have a peripheral length shorter than the peripheral length of the inner peripheral surface of the shaft hole of the housing 300 and configured not to have an interference. Accordingly, in a state in which the fluid pressure does not act, the outer peripheral surface of the seal ring 100 could be separated from the inner peripheral surface of the housing 300 (see a left side view in FIG. 6).

The seal ring 100 has an abutment joint part 110 at one portion in its circumferential direction. In addition, the seal ring 100 has groove parts 120 on the side of its sliding surface. Note that the seal ring 100 according to the present embodiment is configured to form the above abutment joint part 110 and the plurality of groove parts 120 in its annular member having a rectangle cross section. However, the configuration merely describes the shape of the seal ring 100 and does not necessarily imply that the abutment joint part 110 and the plurality of groove parts 120 are formed using an annular member having a rectangle cross-section as a material. Of course, these parts can be obtained by cutting after an annular member having a rectangle cross section is molded. However, for example, the plurality of groove parts 120 may be obtained by cutting after one having the abutment joint part 110 is molded in advance, and its manufacturing method is not particularly limited.

The configuration of the abutment joint part 110 according to the present embodiment will be described with particular reference to FIGS. 2 to 5. The abutment joint part 110 according to the present embodiment employs a special step cut with which the abutment joint part 110 is cut off in a staircase pattern when seen from the side of the outer peripheral surface and the sides of both lateral wall surfaces. Thus, in the seal ring 100, a first fitting convex part 111 and a first fitting concave part 114 are provided on the side of the outer peripheral surface on one side via a cutting part, whereas a second fitting concave part 113 in which the first fitting convex part 111 is to be fitted and a second fitting convex part 112 that is to be fitted in the first fitting concave part 114 are provided on the side of the outer peripheral surface on the other side via the cutting part. Note that an end surface 115 on the side of the inner peripheral surface on the one side and an end surface 116 on the side of the inner periphery on the other side face each other via the cutting part. The special step cut is a known art, and thus its detailed description will be omitted. However, the special step cut has the property of maintaining stable sealing performance even if the circumferential length of the seal ring 100 changes due to its thermal expansion/contraction. Note that the "cutting part" includes not only a cutting part cut off by cutting but also a cutting part obtained by molding. Here, the case in which the special step cut is employed is described, but a straight cut, a bias cut, a step cut, or the like can be employed. Note that when a material (such as PTFE) having low elasticity is employed as the material of the seal ring 100, the seal ring 100 may be endless without having the abutment joint part 110.

The groove parts 120 are provided in plurality at even intervals over a circumference of a lateral surface of the seal ring 100 on the side of the sliding surface, excluding the vicinity of the abutment joint part 110 (see FIG. 1). The plurality of groove parts 120 is provided to generate dynamic pressure when the seal ring 100 slides on a lateral wall surface 211 on a lower pressure side (L) in the annular groove 210 provided on the shaft 200.

Further, the groove parts 120 have a first groove extending in the circumferential direction and a second groove extending from a central position of the first groove in the circumferential direction to the inner peripheral surface and guiding sealed fluid into the first groove. In addition, the first groove has dynamic pressure generation grooves configured to have a groove bottom made shallower at their end in the circumferential direction than at their central part in the circumferential direction, and has a foreign matter catching groove that has a groove bottom deeper than the groove bottoms of the dynamic pressure generation grooves and is capable of catching foreign matter. Moreover, the first groove is provided at a position that falls within a sliding region X in which the seal ring 100 slides on the lateral wall surface 211 on the lower pressure side (L).

<Mechanism Where Seal Ring is in Use>

A mechanism where the seal ring 100 according to the present embodiment is in use will be described with particular reference to FIG. 6. When differential pressure is generated with the start of an engine, the seal ring 100 is brought into intimate contact with the lateral wall surface 211 on the lower pressure side (L) of the annular groove 210 and the inner peripheral surface of the shaft hole of the housing 300.

Thus, it becomes possible to seal the annular gap between the shaft 200 and the housing 300 that rotate relative to each other, to maintain the fluid pressure of the sealed region (a region on the higher pressure side (H)) in which the fluid pressure is configured to change. Further, when the shaft 200 and the housing 300 rotate relative to each other, the seal ring 100 slides on the lateral wall surface 211 on the lower pressure side (L) of the annular groove 210. Further, dynamic pressure is generated when sealed fluid flows out to a sliding part from the dynamic pressure generation grooves of the groove part 120 provided on the lateral surface on the side of the sliding surface of the seal ring 100. Note that when the seal ring 100 rotates in a clockwise direction in FIG. 1 relative to the annular groove 210, the sealed fluid flows out to the sliding part from the ends in the counterclockwise direction of the dynamic pressure generation grooves. Further, when the seal ring 100 rotates in the counterclockwise direction in FIG. 1 relative to the annular groove 210, the sealed fluid flows out to the sliding part from the ends in the clockwise direction of the dynamic pressure generation grooves.

<Excellent Point of Seal Ring According to Present Embodiment>

In the seal ring 100 according to the present embodiment, sealed fluid is guided into the groove parts 120. Therefore, in ranges in which the groove parts 120 are provided, fluid pressure acting on the seal ring 100 from the higher pressure side (H) and fluid pressure acting on the seal ring 100 from the lower pressure side (L) cancel each other. Thus, the pressure receiving area of the seal ring 100 to receive the fluid pressure (fluid pressure from the higher pressure side (H) to the lower pressure side (L)) can be reduced. In addition, when the seal ring 100 slides on the lateral wall surface 211 on the lower pressure side (L) of the annular groove 210, the sealed fluid flows out from the dynamic pressure generation grooves to the sliding part to generate dynamic pressure. Thus, a force is generated in the seal ring 100 in a direction away from the lateral wall surface 211. Further, since the dynamic pressure generation grooves are configured to have a groove bottom made shallower at their end in the circumferential direction than at their center in the circumferential direction, the above dynamic pressure can be effectively generated by a wedge effect. As described above, the reduction in the pressure receiving area and the generation of the force in the seal ring 100 in the direction away from the lateral wall surface 211 due to the dynamic pressure work together. Thus, it becomes possible to effectively reduce a rotational torque. Since the reduction in the rotational torque (sliding torque) can be realized like this, heat generation due to the sliding can be prevented. Under high speed and high pressure conditions, it becomes possible to suitably use the seal ring 100 according to the present embodiment. As a result, a soft material such as aluminum can be used as the material of the shaft 200.

In addition, since foreign matter is caught by the foreign matter catching groove, the impairment of the dynamic pressure generation function of the dynamic pressure generation grooves due to the foreign matter is prevented. That is, foreign matter can be prevented from being put between the dynamic pressure generation grooves and the lateral wall surface 211. Thus, a reduction in dynamic pressure effect can be prevented, and the acceleration of wear-out can be prevented. Moreover, since the first groove is provided at the position that falls within the sliding region X in which the seal ring 100 slides on the lateral wall surface 211, the leakage of the sealed fluid can be prevented.

Hereinafter, more specific examples (first to tenth examples) of the groove part 120 will be described.

First Example

Figure 7:
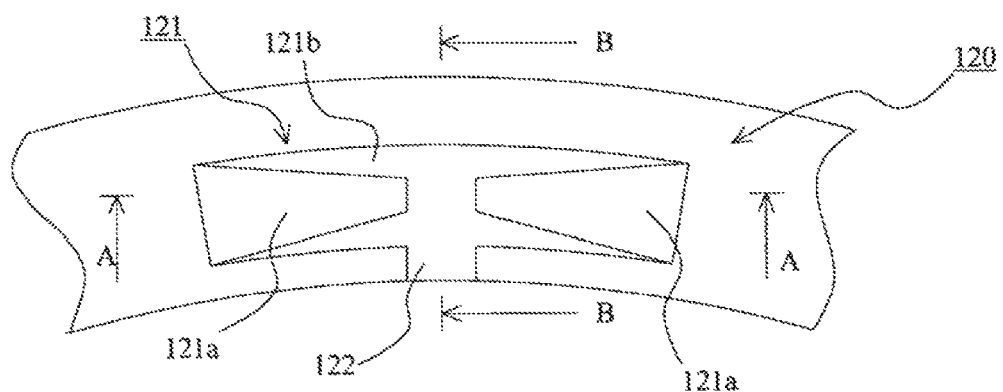
FIG. 7 is a partially enlarged view of the side view of a seal ring according to a first example of the present disclosure.
Figure 8:
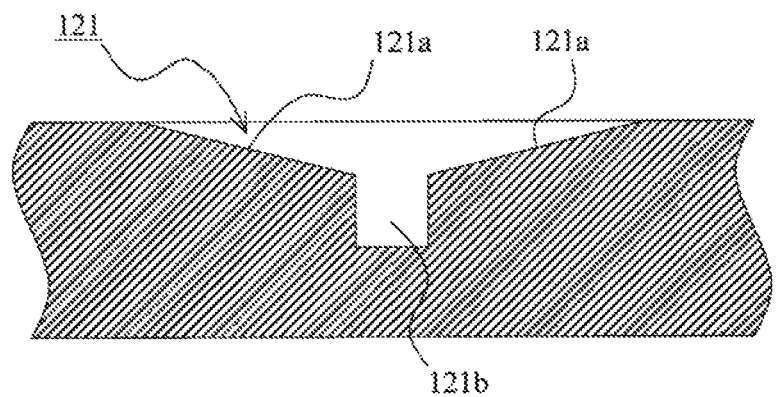
FIG. 8 is a schematic cross-sectional view of the seal ring according to the first example of the present disclosure.
Figure 9:
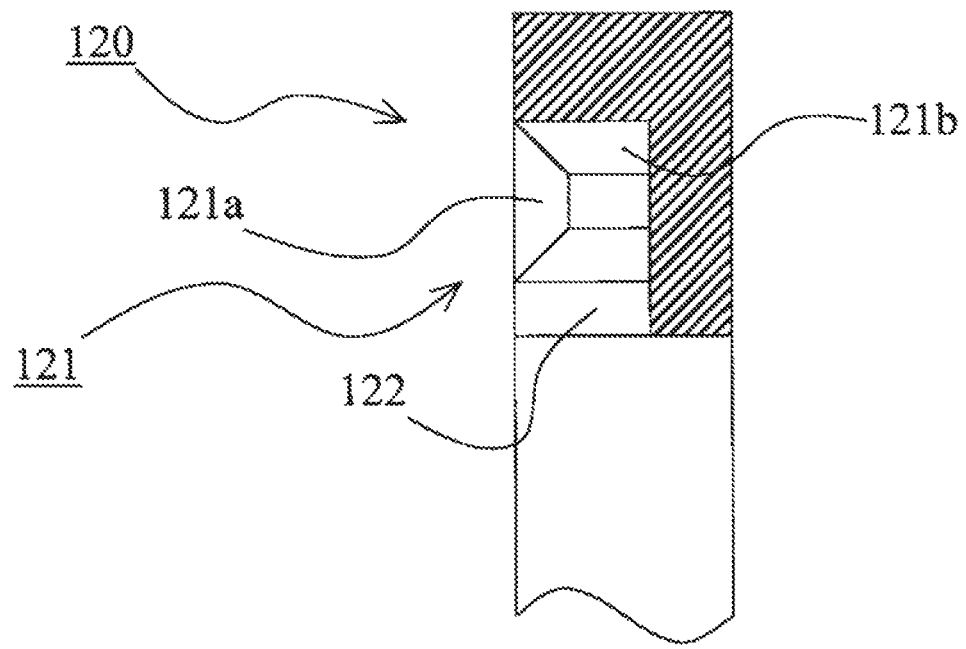
FIG. 9 is a schematic cross-sectional view of the seal ring according to the first example of the present disclosure.

A groove part 120 according to a first example will be described with reference to FIGS. 7 to 9. FIG. 7 is a partially enlarged view of the side view of a seal ring according to the first example of the present disclosure in which the vicinity of the groove part 120 is enlarged. FIG. 8 is a schematic cross-sectional view of the seal ring according to the first example of the present disclosure in which an A-A cross-section in FIG. 7 is shown. FIG. 9 is a schematic cross-sectional view of the seal ring according to the first example of the present disclosure in which a B-B cross-section in FIG. 7 is shown.

As described in the above embodiment, the seal ring 100 has the groove parts 120 on the side of the sliding surface. The groove part 120 according to the present example is configured by a first groove 121 extending in a circumferential direction and a second groove 122 extending from a central position of the first groove 121 in the circumferential direction to an inner peripheral surface and guiding sealed fluid into the first groove 121.

The first groove 121 according to the present example is configured to have a constant width in a radial direction. As described in the above embodiment, the first groove 121 is provided at a position that falls within the sliding region X in which the seal ring 100 slides on the lateral wall surface 211 on the lower pressure side (L) of the annular groove 210. Further, the first groove 121 is configured by dynamic pressure generation grooves 121a configured to have a groove bottom made shallower at their end in the circumferential direction than at their central part in the circumferential direction, and configured by a foreign matter catching groove 121b that has a groove bottom deeper than the groove bottoms of the dynamic pressure generation grooves 121a and is capable of catching foreign matter.

The dynamic pressure generation grooves 121a are provided on both sides of a center in the circumferential direction of the first groove 121. Further, the pair of dynamic pressure generation grooves 121a is configured to be made gradually shallower from their central side in the circumferential direction to the end in the circumferential direction. In the present example, the groove bottoms of the pair of dynamic pressure generation grooves 121a are configured by planar inclined surfaces. In addition, the pair of dynamic pressure generation grooves 121a is configured to have a width in the radial direction gradually expanded from the central side in the circumferential direction to the end in the circumferential direction. Moreover, the pair of dynamic pressure generation grooves 121a is configured to have a trapezoidal planar shape.

In addition, the foreign matter catching groove 121b is provided over an entire region in the circumferential direction of the first groove 121. More specifically, the foreign matter catching groove 121b is provided at a central part in the circumferential direction of the first groove 121 and provided at parts on the sides of the inner peripheral surfaces and the outer peripheral surfaces of the pair of dynamic pressure generation grooves 121a.

Moreover, in the present example, the groove bottom of the second groove 122 is set to have a depth which is greater than the depth of the groove bottoms of the dynamic pressure generation grooves 121a and at which foreign matter can be caught. More specifically, the depth of the groove bottom of the second groove 122 and the depth of the groove bottom of the foreign matter catching groove 121b are set to be the same.

By the groove part 120 according to the present example configured as described above, the functions and effects described in the above embodiment can be obtained. In addition, in the present example, since the dynamic pressure generation grooves 121a are provided on both sides of the center in the circumferential direction of the first groove 121, the dynamic pressure generation function of the dynamic pressure generation grooves 121a can be exhibited regardless of the rotating direction of the seal ring 100 relative to the shaft 200. In addition, since the dynamic pressure generation grooves 121a are provided to have the width in the radial direction expanded toward the end in the circumferential direction, a width in the radial direction of sealed fluid flowing out from the dynamic pressure generation grooves 121a to the sliding part can be widened. Moreover, in the present example, the groove bottom of the second groove 122 is set to have a depth which is greater than the depth of the groove bottoms of the dynamic pressure generation grooves 121a and at which foreign matter can be caught. Accordingly, the second groove 122 also exhibits the function of catching foreign matter, and thus the intrusion of the foreign matter into the dynamic pressure generation grooves 121a can be further prevented.

Second Example

Figure 10:
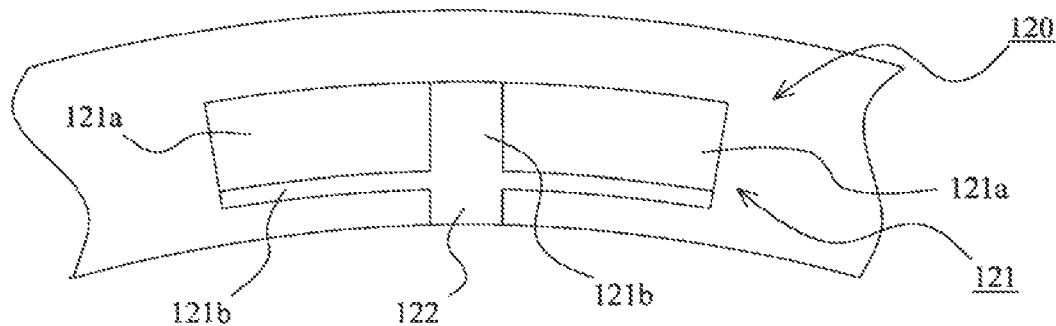
FIG. 10 is a partially enlarged view of the side view of a seal ring according to a second example of the present disclosure.

FIG. 10 shows a second example of the present disclosure. The present example is a modified example of the above first example and different from the first example in regions in which dynamic pressure generation grooves 121a and a foreign matter catching groove 121b are arranged. FIG. 10 is a partially enlarged view of the side view of a seal ring according to the second example of the present disclosure in which the vicinity of a groove part 120 is enlarged.

In the present example as well, the dynamic pressure generation grooves 121a are provided on both sides of a center in a circumferential direction of a first groove 121. Further, the pair of dynamic pressure generation grooves 121a is configured to be made gradually shallower from their central side in the circumferential direction to their end in the circumferential direction. Although not particularly shown in the figure, the groove bottoms of the pair of dynamic pressure generation grooves 121a are configured by planar inclined surfaces in the present example as well. In addition, in the present example, the pair of dynamic pressure generation grooves 121a is configured to have a constant width in a radial direction. Accordingly, the pair of dynamic pressure generation grooves 121a is configured to have a substantially square planar shape.

In addition, the foreign matter catching groove 121b is provided over an entire region in the circumferential direction of the first groove 121. More specifically, the foreign matter catching groove 121b is provided at a central part in the circumferential direction of the first groove 121 and provided at parts on the side of the inner peripheral surfaces of the pair of dynamic pressure generation grooves 121a.

Moreover, in the present example as well, the groove bottom of a second groove 122 is set to have a depth which is greater than the depth of the groove bottoms of the dynamic pressure generation grooves 121a and at which foreign matter can be caught. More specifically, the depth of the groove bottom of the second groove 122 and the depth of the groove bottom of the foreign matter catching groove 121b are set to be the same.

By the groove part 120 according to the present example configured as described above, the functions and effects described in the above embodiment can be obtained. In addition, since the dynamic pressure generation grooves 121a are provided on both sides of the center in the circumferential direction of the first groove 121 in the present example as well, the dynamic pressure generation function of the dynamic pressure generation grooves 121a can be exhibited regardless of the rotating direction of the seal ring 100 relative to the shaft 200. Moreover, in the present example, the groove bottom of the second groove 122 is set to have a depth which is greater than the depth of the groove bottoms of the dynamic pressure generation grooves 121a and at which foreign matter can be caught. Accordingly, the second groove 122 also exhibits the function of catching foreign matter, and thus the intrusion of the foreign matter into the dynamic pressure generation grooves 121a can be further prevented.

Third Example

Figure 11:
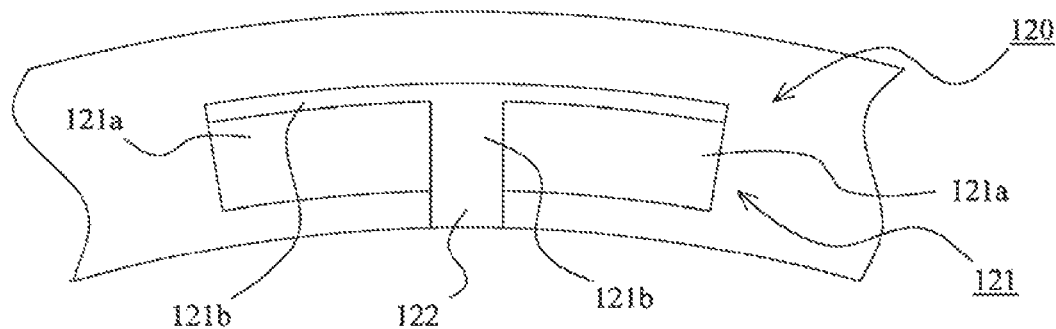
FIG. 11 is a partially enlarged view of the side view of a seal ring according to a third example of the present disclosure.

FIG. 11 shows a third example of the present disclosure. The present example is a modified example of the above first example and different from the first example in regions in which dynamic pressure generation grooves 121a and a foreign matter catching groove 121b are arranged. FIG. 11 is a partially enlarged view of the side view of a seal ring according to the third example of the present disclosure in which the vicinity of a groove part 120 is enlarged.

In the present example as well, the dynamic pressure generation grooves 121a are provided on both sides of a center in a circumferential direction of a first groove 121. Further, the pair of dynamic pressure generation grooves 121a is configured to be made gradually shallower from their central side in the circumferential direction to their end in the circumferential direction. Although not particularly shown in the figure, the groove bottoms of the pair of dynamic pressure generation grooves 121a are configured by planar inclined surfaces in the present example as well. In addition, in the present example, the pair of dynamic pressure generation grooves 121a is configured to have a constant width in a radial direction. Accordingly, the pair of dynamic pressure generation grooves 121a is configured to have a substantially square planar shape.

In addition, the foreign matter catching groove 121b is provided over an entire region in the circumferential direction of the first groove 121. More specifically, the foreign matter catching groove 121b is provided at a central part in the circumferential direction of the first groove 121 and provided at parts on the side of the outer peripheral surfaces of the pair of dynamic pressure generation grooves 121a.

Moreover, in the present example as well, the groove bottom of a second groove 122 is set to have a depth which is greater than the depth of the groove bottoms of the dynamic pressure generation grooves 121a and at which foreign matter can be caught. More specifically, the depth of the groove bottom of the second groove 122 and the depth of the groove bottom of the foreign matter catching groove 121b are set to be the same.

By the groove part 120 according to the present example configured as described above, the same functions and effects as those of the above second example can be obtained.

Fourth Example

Figure 12:
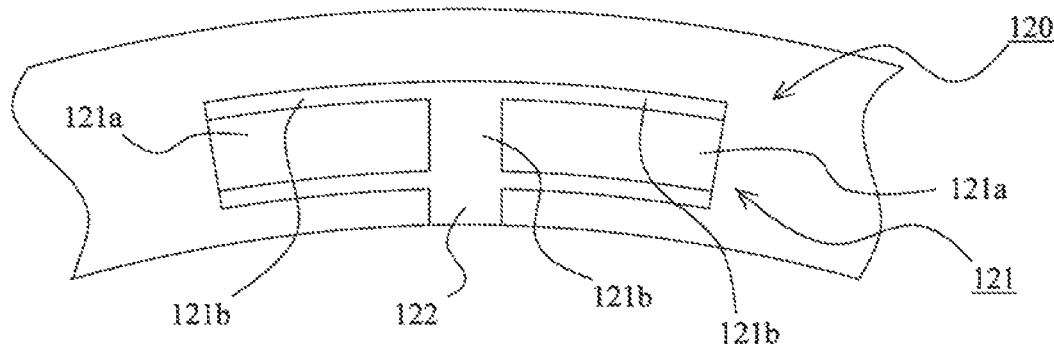
FIG. 12 is a partially enlarged view of the side view of a seal ring according to a fourth example of the present disclosure.

FIG. 12 shows a fourth example of the present disclosure. The present example is a modified example of the above first example and different from the first example in regions in which dynamic pressure generation grooves 121a and a foreign matter catching groove 121b are arranged. FIG. 12 is a partially enlarged view of the side view of a seal ring according to the fourth example of the present disclosure in which the vicinity of a groove part 120 is enlarged.

In the present example as well, the dynamic pressure generation grooves 121a are provided on both sides of a center in a circumferential direction of a first groove 121. Further, the pair of dynamic pressure generation grooves 121a is configured to be made gradually shallower from their central side in the circumferential direction to their end in the circumferential direction. Although not particularly shown in the figure, the groove bottoms of the pair of dynamic pressure generation grooves 121a are configured by planar inclined surfaces in the present example as well. In addition, in the present example, the pair of dynamic pressure generation grooves 121a is configured to have a constant width in a radial direction. Accordingly, the pair of dynamic pressure generation grooves 121a is configured to have a substantially square planar shape.

In addition, the foreign matter catching groove 121b is provided over an entire region in the circumferential direction of the first groove 121. More specifically, the foreign matter catching groove 121b is provided at a central part in the circumferential direction of the first groove 121 and provided at parts on the sides of the inner peripheral surfaces and the outer peripheral surfaces of the pair of dynamic pressure generation grooves 121a.

Moreover, in the present example as well, the groove bottom of a second groove 122 is set to have a depth which is greater than the depth of the groove bottoms of the dynamic pressure generation grooves 121a and at which foreign matter can be caught. More specifically, the depth of the groove bottom of the second groove 122 and the depth of the groove bottom of the foreign matter catching groove 121b are set to be the same.

By the groove part 120 according to the present example configured as described above, the same functions and effects as those of the above second and third examples can be obtained.

Fifth Example

Figure 13:
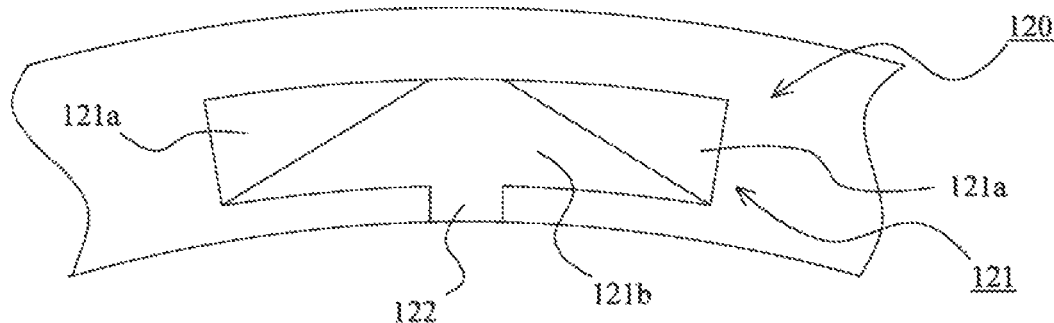
FIG. 13 is a partially enlarged view of the side view of a seal ring according to a fifth example of the present disclosure.

FIG. 13 shows a fifth example of the present disclosure. The present example is a modified example of the above first example and different from the first example in regions in which dynamic pressure generation grooves 121a and a foreign matter catching groove 121b are arranged. FIG. 13 is a partially enlarged view of the side view of a seal ring according to the fifth example of the present disclosure in which the vicinity of a groove part 120 is enlarged.

In the present example as well, the dynamic pressure generation grooves 121a are provided on both sides of a center in a circumferential direction of a first groove 121. Further, the pair of dynamic pressure generation grooves 121a is configured to be made gradually shallower from their central side in the circumferential direction to their end in the circumferential direction. Although not particularly shown in the figure, the groove bottoms of the pair of dynamic pressure generation grooves 121a are configured by planar inclined surfaces in the present example as well. In addition, the pair of dynamic pressure generation grooves 121a is configured to have a width in a radial direction gradually expanded from the central side in the circumferential direction to the end in the circumferential direction. Note that unlike the above first example, the dynamic pressure generation grooves 121a in the present example are provided to be arranged along the side of an outer peripheral surface in the first groove 121. Accordingly, the pair of dynamic pressure generation grooves 121a is configured to have a triangular planar shape.

In addition, the foreign matter catching groove 121b is provided over an entire region in the circumferential direction of the first groove 121. More specifically, the foreign matter catching groove 121b is provided at a central part in the circumferential direction of the first groove 121 and provided at parts on the side of the inner peripheral surfaces of the pair of dynamic pressure generation grooves 121a.

Moreover, in the present example as well, the groove bottom of a second groove 122 is set to have a depth which is greater than the depth of the groove bottoms of the dynamic pressure generation grooves 121a and at which foreign matter can be caught. More specifically, the depth of the groove bottom of the second groove 122 and the depth of the groove bottom of the foreign matter catching groove 121b are set to be the same.

By the groove part 120 according to the present example configured as described above, the same functions and effects as those of the above first example can be obtained.

Sixth Example

Figure 14:
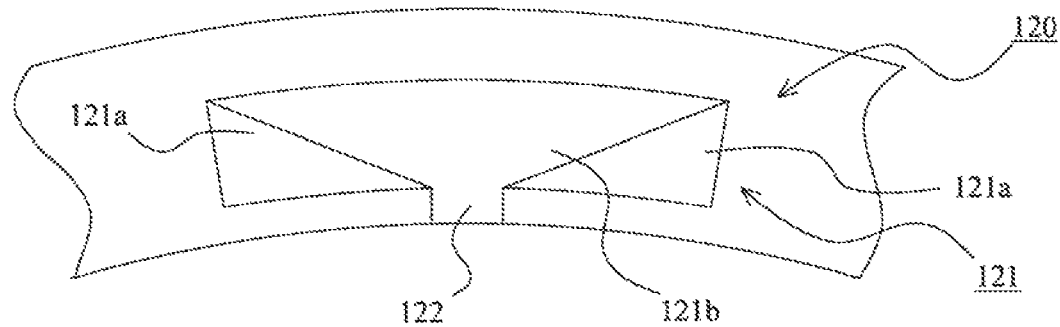
FIG. 14 is a partially enlarged view of the side view of a seal ring according to a sixth example of the present disclosure.

FIG. 14 shows a sixth example of the present disclosure. The present example is a modified example of the above first example and different from the first example in regions in which dynamic pressure generation grooves 121a and a foreign matter catching groove 121b are arranged. FIG. 14 is a partially enlarged view of the side view of a seal ring according to the sixth example of the present disclosure in which the vicinity of a groove part 120 is enlarged.

In the present example as well, the dynamic pressure generation grooves 121a are provided on both sides of a center in a circumferential direction of a first groove 121. Further, the pair of dynamic pressure generation grooves 121a is configured to be made gradually shallower from their central side in the circumferential direction to their end in the circumferential direction. Although not particularly shown in the figure, the groove bottoms of the pair of dynamic pressure generation grooves 121a are configured by planar inclined surfaces in the present example as well. In addition, the pair of dynamic pressure generation grooves 121a is configured to have a width in a radial direction gradually expanded from the central side in the circumferential direction to the end in the circumferential direction. Note that unlike the above first example, the dynamic pressure generation grooves 121a in the present example are provided to be arranged along the side of an inner peripheral surface in the first groove 121. Thus, the pair of dynamic pressure generation grooves 121a is configured to have a triangular planar shape.

In addition, the foreign matter catching groove 121b is provided over an entire region in the circumferential direction of the first groove 121. More specifically, the foreign matter catching groove 121b is provided at a central part in the circumferential direction of the first groove 121 and provided at parts on the side of the outer peripheral surfaces of the pair of dynamic pressure generation grooves 121*a*.

Moreover, in the present example as well, the groove bottom of a second groove 122 is set to have a depth which is greater than the depth of the groove bottoms of the dynamic pressure generation grooves 121*a* and at which foreign matter can be caught. More specifically, the depth of the groove bottom of the second groove 122 and the depth of the groove bottom of the foreign matter catching groove 121*b* are set to be the same.

By the groove part 120 according to the present example configured as described above, the same functions and effects as those of the above first example can be obtained.

Seventh Example

Figure 15:
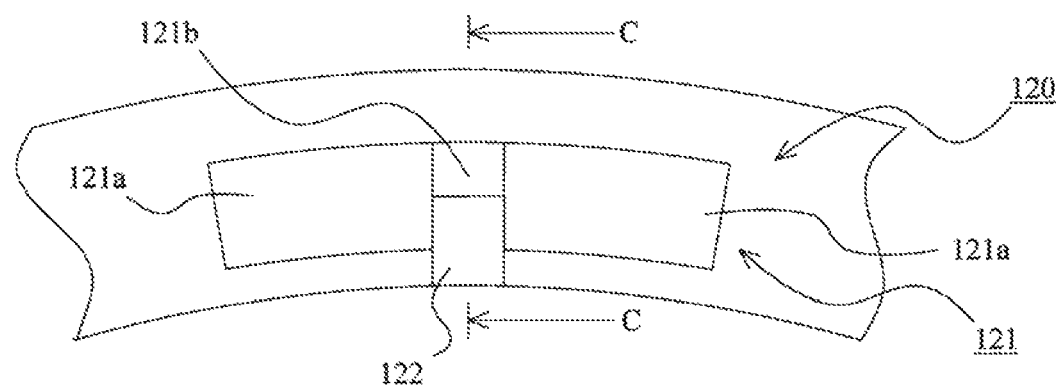
FIG. 15 is a partially enlarged view of the side view of a seal ring according to a seventh example of the present disclosure.
Figure 16:
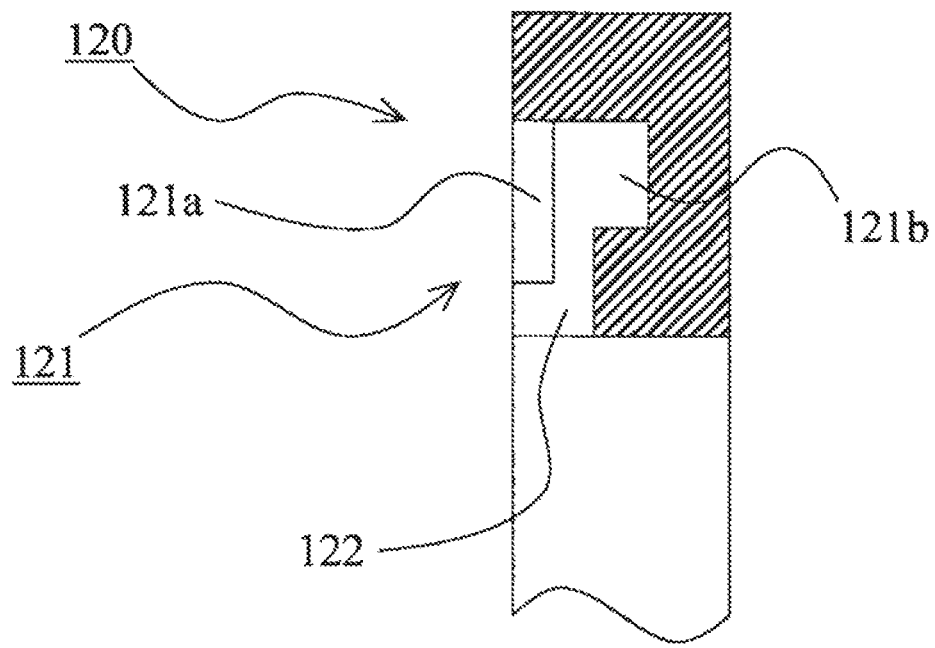
FIG. 16 is a schematic cross-sectional view of the seal ring according to the seventh example of the present disclosure.

FIGS. 15 and 16 show a seventh example of the present disclosure. The present example is a modified example of the above first example and different from the first example in regions in which dynamic pressure generation grooves 121*a* and a foreign matter catching groove 121*b* are arranged. FIG. 15 is a partially enlarged view of the side view of a seal ring according to the seventh example of the present disclosure in which the vicinity of a groove part 120 is enlarged. FIG. 16 is a schematic cross-sectional view of the seal ring according to the seventh example of the present disclosure in which a C-C cross-section in FIG. 16 is shown.

In the present example as well, the dynamic pressure generation grooves 121*a* are provided on both sides of a center in a circumferential direction of a first groove 121. Further, the pair of dynamic pressure generation grooves 121*a* is configured to be made gradually shallower from their central side in the circumferential direction to their end in the circumferential direction. Although not particularly shown in the figure, the groove bottoms of the pair of dynamic pressure generation grooves 121*a* are configured by planar inclined surfaces in the present example as well. In addition, in the present example, the pair of dynamic pressure generation grooves 121*a* is configured to have a constant width in a radial direction. Accordingly, the pair of dynamic pressure generation grooves 121*a* is configured to have a substantially square planar shape.

In addition, unlike the first to sixth examples, the foreign matter catching groove 121*b* in the present example is provided only at the center in the circumferential direction of the first groove 121. More specifically, the foreign matter catching groove 121*b* is provided only on the extension of a second groove 122 in the first groove 121.

By the groove part 120 according to the present example configured as described above, the functions and effects described in the above embodiment can be obtained. In addition, since the dynamic pressure generation grooves 121*a* are provided on both sides of the center in the circumferential direction of the first groove 121 in the present example as well, the dynamic pressure generation function of the dynamic pressure generation grooves 121*a* can be exhibited regardless of the rotating direction of the seal ring 100 relative to the shaft 200.

Eighth Example

Figure 17:
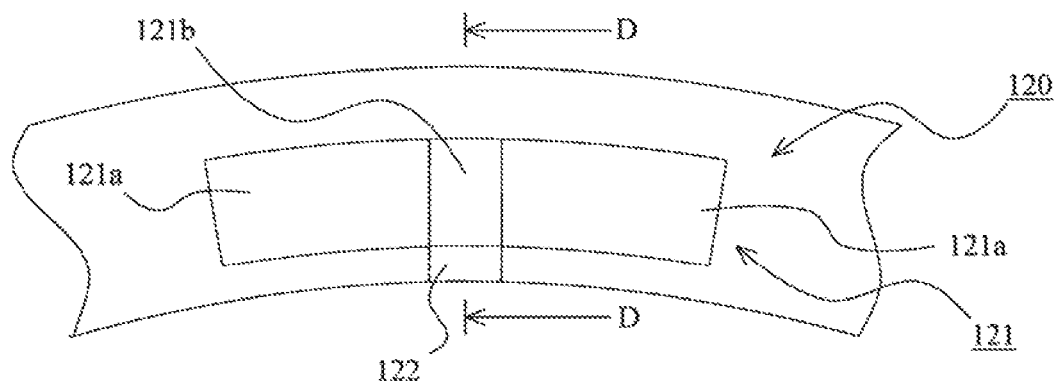
FIG. 17 is a partially enlarged view of the side view of a seal ring according to an eighth example of the present disclosure.
Figure 18:
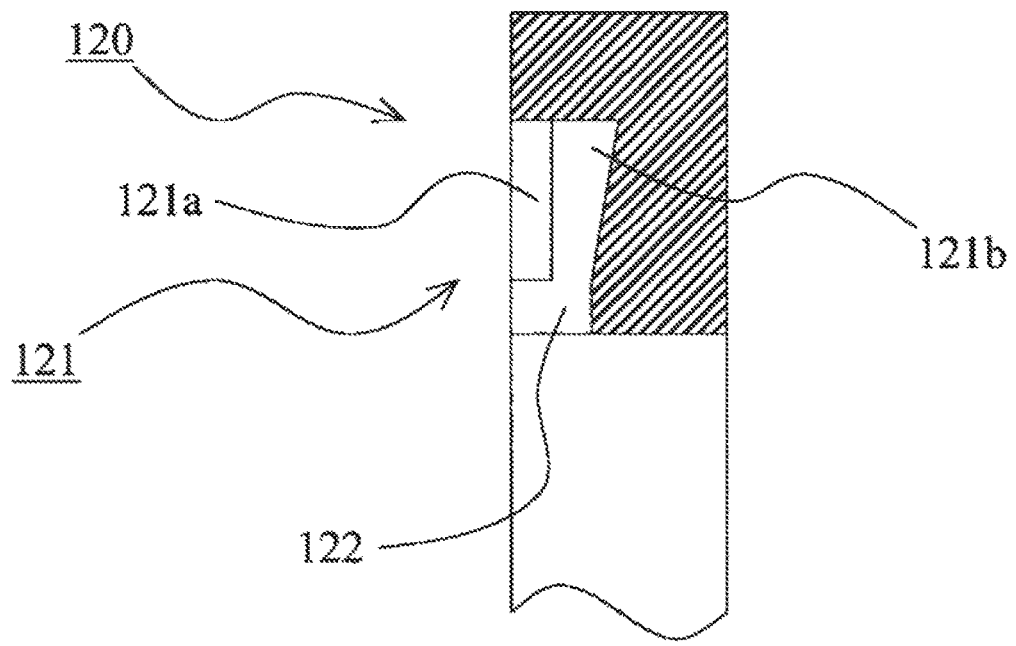
FIG. 18 is a schematic cross-sectional view of the seal ring according to the eighth example of the present disclosure.

FIGS. 17 and 18 show an eighth example of the present disclosure. The present example is a modified example of the above first example and different from the first example in regions in which dynamic pressure generation grooves 121*a* and a foreign matter catching groove 121*b* are arranged. FIG. 17 is a partially enlarged view of the side view of a seal ring according to the eighth example of the present disclosure in which the vicinity of a groove part 120 is enlarged. FIG. 18 is a schematic cross-sectional view of the seal ring according to the eighth example of the present disclosure in which a D-D cross-section in FIG. 17 is shown.

In the present example as well, the dynamic pressure generation grooves 121*a* are provided on both sides of a center in a circumferential direction of a first groove 121. Further, the pair of dynamic pressure generation grooves 121*a* is configured to be made gradually shallower from their central side in the circumferential direction to their end in the circumferential direction. Although not particularly shown in the figure, the groove bottoms of the pair of dynamic pressure generation grooves 121*a* are configured by planar inclined surfaces in the present example as well. In addition, in the present example, the pair of dynamic pressure generation grooves 121*a* is configured to have a constant width in a radial direction. Accordingly, the pair of dynamic pressure generation grooves 121*a* is configured to have a substantially square planar shape.

In addition, unlike the first to sixth examples, the foreign matter catching groove 121*b* is provided only at the center in the circumferential direction of the first groove 121 in the present example. More specifically, the foreign matter catching groove 121*b* is provided only on the extension of a second groove 122 in the first groove 121. Further, unlike the seventh example, the groove bottom of the foreign matter catching groove 121*b* is configured to be made gradually shallower toward the second groove 122 in the present example.

By the groove part 120 according to the present example configured as described above, the functions and effects described in the above embodiment can be obtained. In addition, since the dynamic pressure generation grooves 121*a* are provided on both sides of the center in the circumferential direction of the first groove 121 in the present example as well, the dynamic pressure generation function of the dynamic pressure generation grooves 121*a* can be exhibited regardless of the rotating direction of the seal ring 100 relative to the shaft 200. Moreover, since the groove bottom of the foreign matter catching groove 121*b* is configured to be made gradually shallower toward the second groove 122 in the present example, foreign matter intruding from the second groove 122 can be efficiently guided into the foreign matter catching groove 121*b*. Thus, the intrusion of the foreign matter into the dynamic pressure generation grooves 121*a* can be further prevented.

Ninth Example

Figure 19:
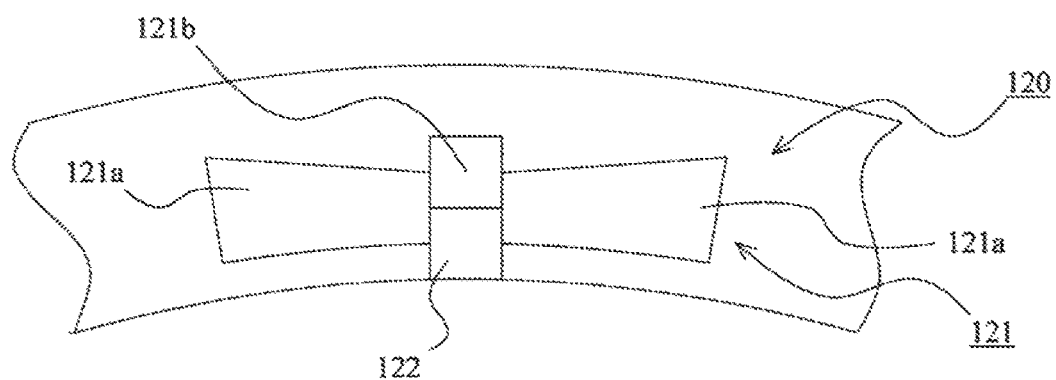
FIG. 19 is a partially enlarged view of the side view of a seal ring according to a ninth example of the present disclosure.

FIG. 19 shows a ninth example of the present disclosure. The present example is a modified example of the above first example and different from the first example in regions in which dynamic pressure generation grooves 121*a* and a foreign matter catching groove 121*b* are arranged. FIG. 19 is a partially enlarged view of the side view of a seal ring according to the ninth example of the present disclosure in which the vicinity of a groove part 120 is enlarged.

In the present example as well, the dynamic pressure generation grooves 121*a* are provided on both sides of a center in a circumferential direction of a first groove 121. Further, the pair of dynamic pressure generation grooves 121*a* is configured to be made gradually shallower from their central side in the circumferential direction to their end in the circumferential direction. Although not particularly shown in the figure, the groove bottoms of the pair of dynamic pressure generation grooves 121a are configured by planar inclined surfaces in the present example as well. In addition, the pair of dynamic pressure generation grooves 121a is configured to have a width in a radial direction gradually expanded from the central side in the circumferential direction to the end in the circumferential direction. Moreover, the pair of dynamic pressure generation grooves 121a is configured to have a trapezoidal planar shape.

In addition, unlike the first to sixth examples, the foreign matter catching groove 121b is provided only at the center in the circumferential direction of the first groove 121 in the present example. More specifically, the foreign matter catching groove 121b is provided only on the extension of a second groove 122 in the first groove 121.

By the groove part 120 according to the present example configured as described above, the functions and effects described in the above embodiment can be obtained. In addition, since the dynamic pressure generation grooves 121a are provided on both sides of the center in the circumferential direction of the first groove 121 in the present example as well, the dynamic pressure generation function of the dynamic pressure generation grooves 121a can be exhibited regardless of the rotating direction of the seal ring 100 relative to the shaft 200. In addition, since the dynamic pressure generation grooves 121a are provided to have the width in the radial direction expanded toward the end in the circumferential direction, a width in grooves 121a to the sliding part can be widened.

Tenth Example

Figure 20:
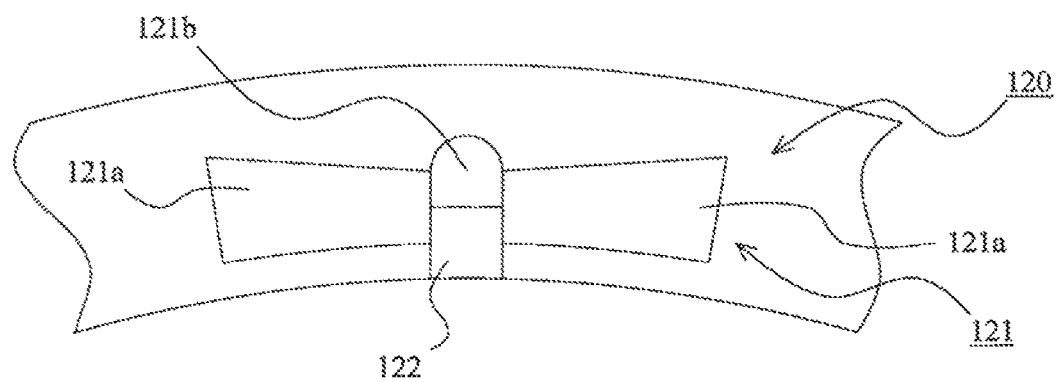
FIG. 20 is a partially enlarged view of the side view of a seal ring according to a tenth example of the present disclosure.

FIG. 20 shows a tenth example of the present disclosure. The present example is a modified example of the above ninth example and different only in the planar shape of a foreign matter catching groove 121b. That is, the foreign matter catching groove 121b in the above ninth example has a rectangular planar shape, whereas the foreign matter catching groove 121b in the present example has a circular planar shape on the side of its outer peripheral surface. The same functions and effects as those of the above ninth example can be obtained in the present example as well.

Other

Regions in which dynamic pressure generation grooves 121a and a foreign matter catching groove 121b are arranged are not limited to the regions shown in the respective first to tenth examples, and various arrangement configurations can be employed. In addition, the above respective first to tenth examples describe the cases in which the groove bottoms of the dynamic pressure generation grooves 121a are configured by the planar inclined surfaces, but may be configured by curved inclined surfaces expanding to the side of the inner peripheral surface or the side of the outer peripheral surface. Moreover, the groove parts 120 may be provided only on one surface or both surfaces of the seal ring 100. In short, a surface on which the groove parts 120 are provided may only be required to serve as a sliding surface.

Second Embodiment

Figure 21:
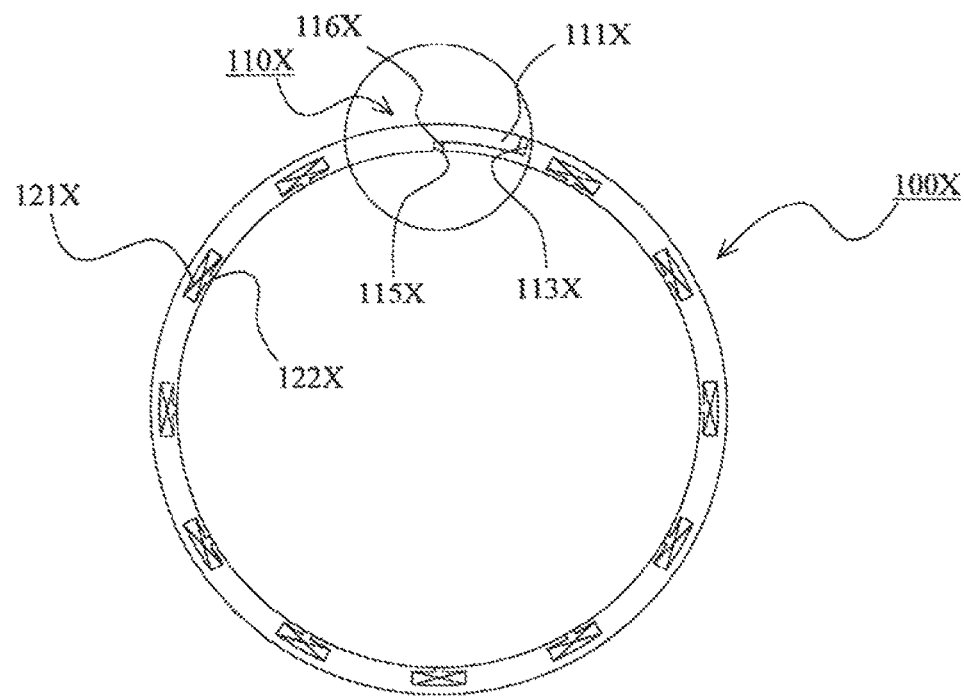
FIG. 21 is a side view of the seal ring according to a second embodiment of the present disclosure.
Figure 22:
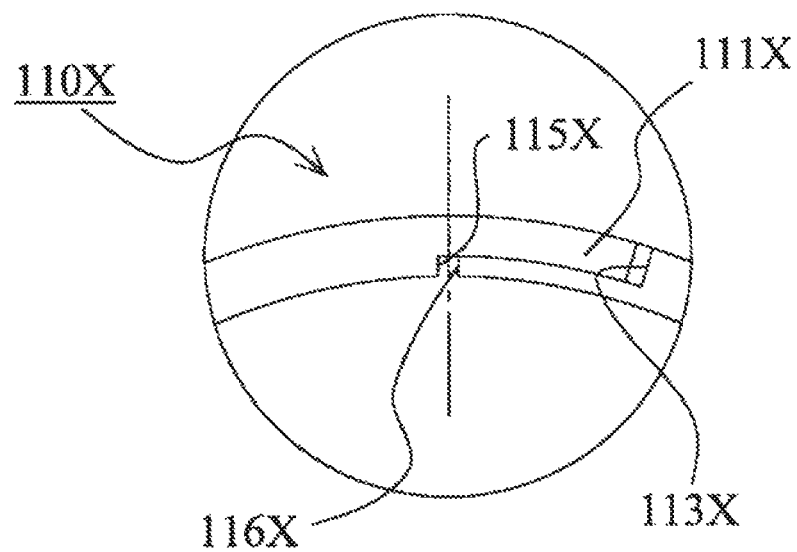
FIG. 22 is a partially enlarged view of the side view of the seal ring according to the second embodiment of the present disclosure.
Figure 23:
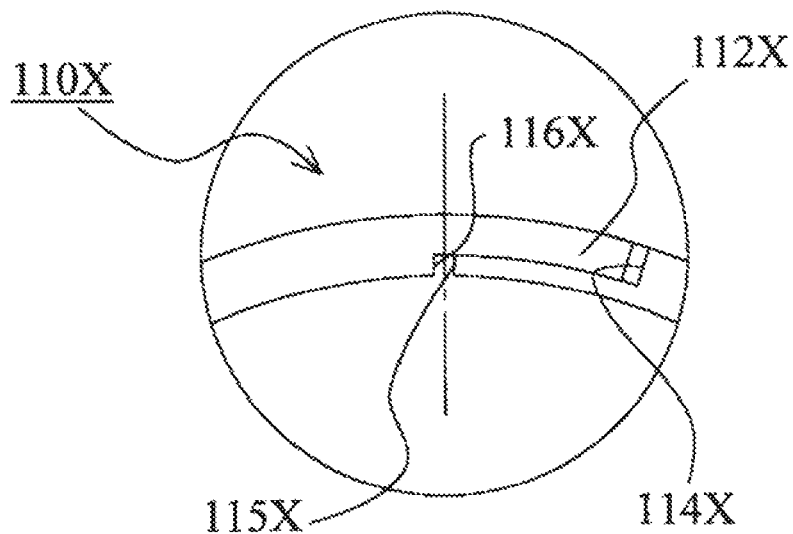
FIG. 23 is a partially enlarged view of the side view of the seal ring according to the second embodiment of the present disclosure.
Figure 24:
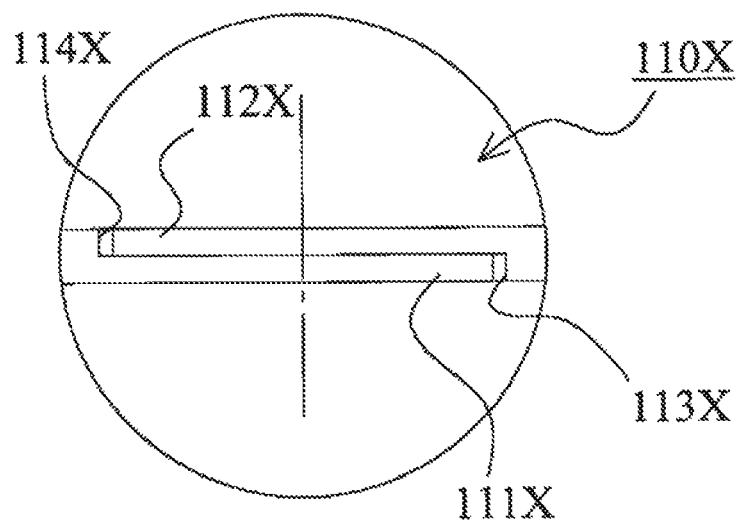
FIG. 24 is a partially enlarged view of the seal ring according to the second embodiment of the present disclosure when seen from the side of its outer peripheral surface.
Figure 25:
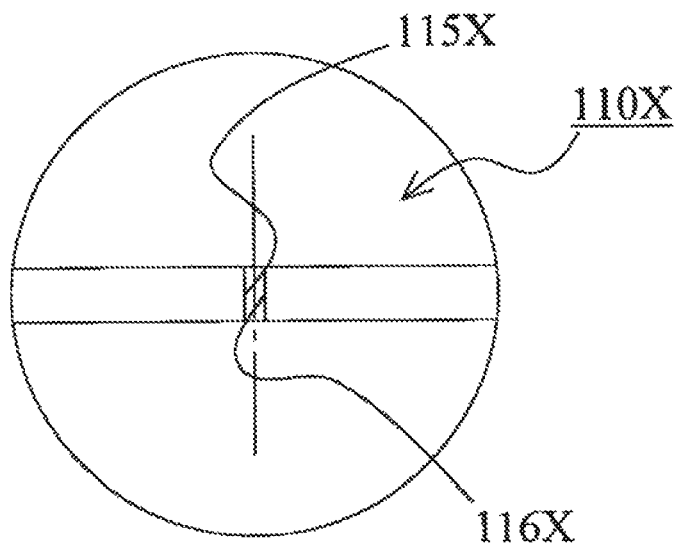
FIG. 25 is a partially enlarged view of the seal ring according to the second embodiment of the present disclosure when seen from the side of its inner peripheral surface.
Figure 26:
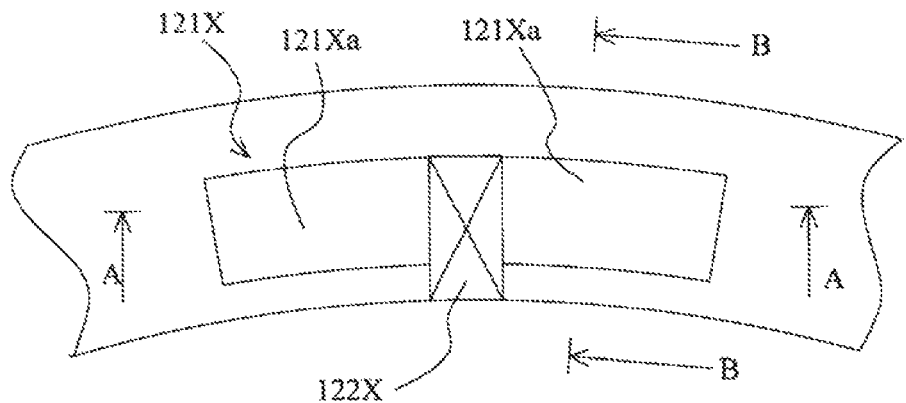
FIG. 26 is a partially enlarged view of the side view of the seal ring according to the second embodiment of the present disclosure.
Figure 27:
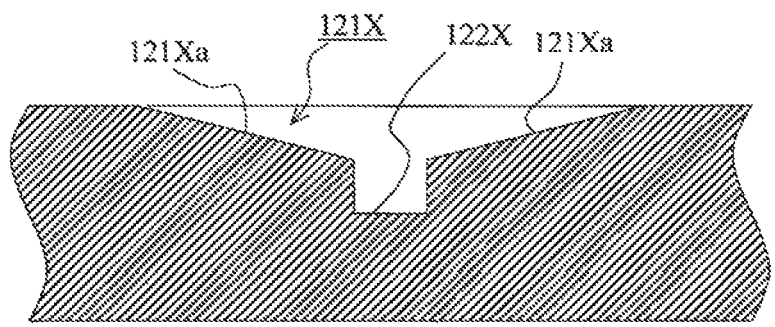
FIG. 27 is a schematic cross-sectional view of the seal ring according to the second embodiment of the present disclosure.
Figure 28:
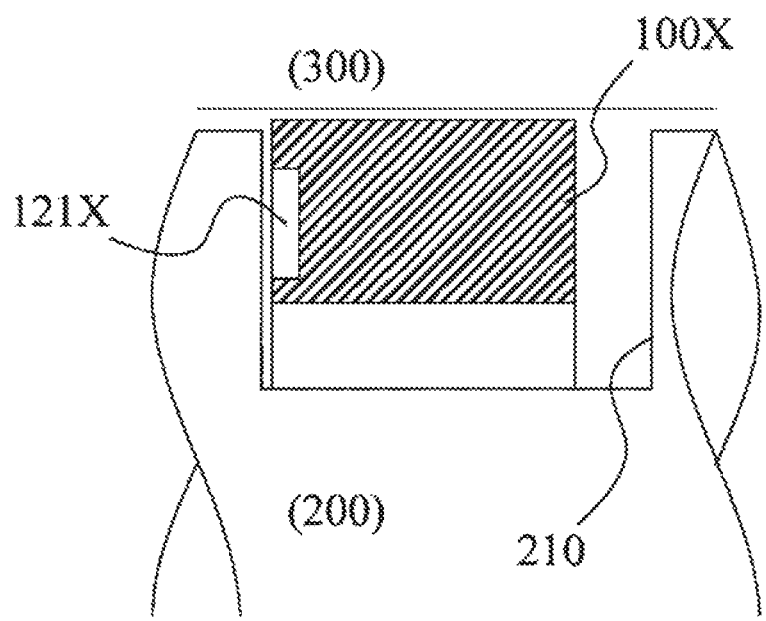
FIG. 28 is a schematic cross-sectional view showing a state where the seal ring according to the second embodiment of the present disclosure is in use.
Figure 29:
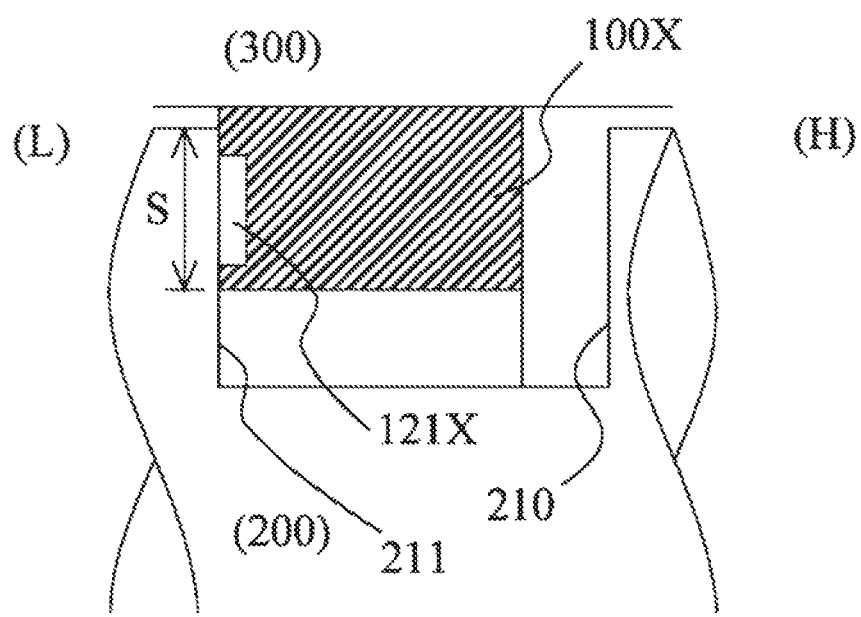
FIG. 29 is a schematic cross-sectional view showing a state where the seal ring according to the second embodiment of the present disclosure is in use.

A seal ring according to a second embodiment of the present disclosure will be described with reference to FIGS. 21 to 29. FIG. 21 is a side view of the seal ring according to the second embodiment of the present disclosure. FIG. 22 is a partially enlarged view of the side view of the seal ring according to the second embodiment of the present disclosure in which a part surrounded by a circle in FIG. 21 is enlarged. FIG. 23 is a partially enlarged view of the side view of the seal ring according to the second embodiment of the present disclosure in which the part surrounded by the circle in FIG. 21 is seen from the opposite side of the seal ring. FIG. 24 is a partially enlarged view of the seal ring according to the second embodiment of the present disclosure when seen from the side of its outer peripheral surface in which the part surrounded by the circle in FIG. 21 is seen from the side of the outer peripheral surface. FIG. 25 is a partially enlarged view of the seal ring according to the second embodiment of the present disclosure when seen from the side of its inner peripheral surface in which the part surrounded by the circle in FIG. 21 is seen from the side of the inner peripheral surface. FIG. 26 is a partially enlarged view of the side view of the seal ring according to the second embodiment of the present disclosure in which the vicinities of a first groove and a second groove are enlarged. FIG. 27 is a schematic cross-sectional view of the seal ring according to the second embodiment of the present disclosure in which an A-A cross section in FIG. 26 is shown. FIGS. 28 and 29 are schematic cross-sectional views showing states where the seal ring according to the second embodiment of the present disclosure is in use. Note that FIG. 28 shows a state in which no load is generated and FIG. 29 shows a state in which differential pressure has been generated. In addition, the seal ring in FIGS. 28 and 29 corresponds to a B-B cross section in FIG. 26.

<Configuration of Seal Ring>

A seal ring 100X according to the present embodiment is attached to an annular groove 210 provided on the outer periphery of a shaft 200 and seals the annular gap between the shaft 200 and a housing 300 (the inner peripheral surface of a shaft hole in which the shaft 200 is to be inserted in the housing 300) that rotate relative to each other. Thus, the seal ring 100X maintains fluid pressure in a sealed region in which the fluid pressure (hydraulic pressure in the present embodiment) is configured to change. Here, in the present embodiment, fluid pressure in a region on the right side of the seal ring 100X in FIGS. 28 and 29 is configured to change. Further, the seal ring 100X plays a role in maintaining the fluid pressure in the sealed region on the right side in the figure via the seal ring 100X. Note that the fluid pressure in the sealed region is low and no load is generated when the engine of an automobile is stopped, whereas the fluid pressure in the sealed region becomes high when the engine is started. In addition, FIG. 29 shows a state in which the fluid pressure on the right side becomes higher than the fluid pressure on the left side. Hereinafter, the right side and the left side in FIG. 29 will be indicated as a higher pressure side (H) and a lower pressure side (L), respectively.

Further, the seal ring 100X is made of a resin material such as polyether ether ketone (PEEK), polyphenylenesulfide (PPS), and polytetrafluoroethylene (PTFE). In addition, the outer peripheral surface of the seal ring 100X is configured to have a peripheral length shorter than the peripheral length of the inner peripheral surface of the shaft hole of the housing 300 and configured not to have an interference. Accordingly, in a state in which the fluid pressure does not act, the outer peripheral surface of the seal ring 100X could be separated from the inner peripheral surface of the shaft hole of the housing 300 (see FIG. 28).

The seal ring 100X has an abutment joint part 110X at one portion in its circumferential direction. In addition, the seal ring 100X has first grooves 121X and second grooves 122X on the side of its sliding surface. Note that the seal ring 100X according to the present embodiment is configured to form the above abutment joint part 110X and the plurality of first grooves 121X and second grooves 122X in an annular member having a rectangle cross section. However, the configuration merely describes the shape of the seal ring 100X and does not necessarily imply that the abutment joint part 110X and the plurality of first grooves 121X and second grooves 122X are formed using an annular member having a rectangle cross-section as a material. Of course, these parts can be obtained by cutting after an annular member having a rectangle cross section is molded. However, for example, the plurality of first grooves 121X and second grooves 122X may be obtained by cutting after one having the abutment joint part 110X is molded in advance, and its manufacturing method is not particularly limited.

The configuration of the abutment joint part 110X according to the present embodiment will be described with particular reference to FIGS. 22 to 25. The abutment joint part 110X according to the present embodiment employs a special step cut with which the abutment joint part 110X is cut off in a staircase pattern when seen from the side of the outer peripheral surface and the sides of both lateral wall surfaces. Thus, in the seal ring 100X, a first fitting convex part 111X and a first fitting concave part 114X are provided on the side of the outer peripheral surface on one side via a cutting part, whereas a second fitting concave part 113X in which the first fitting convex part 111X is to be fitted and a second fitting convex part 112X that is to be fitted in the first fitting concave part 114X are provided on the side of the outer peripheral surface on the other side via the cutting part. Note that an end surface 115X on the side of the inner peripheral surface on the one side and an end surface 116X on the side of the inner periphery on the other side face each other via the cutting part. The special step cut is a known art, and thus its detailed description will be omitted. However, the special step cut has the property of maintaining stable sealing performance even if the circumferential length of the seal ring 100X changes due to its thermal expansion/contraction. Note that the "cutting part" includes not only a cutting part cut off by cutting but also a cutting part obtained by molding.

The first grooves 121X and the second grooves 122X are provided in plurality at even intervals over a circumference of a lateral surface of the seal ring 100X on the side of the sliding surface, excluding the vicinity of the abutment joint part 110X (see FIG. 21). The plurality of first grooves 121X is provided to generate dynamic pressure when the seal ring 100X slides on a lateral wall surface 211 on the lower pressure side (L) in the annular groove 210 provided on the shaft 200.

The first grooves 121X are configured to extend in the circumferential direction. The second grooves 122X are provided to extend from the inner peripheral surface of the seal ring 100X to a position at which the second grooves 122X enter a central position of the first grooves 121X in the circumferential direction. The second grooves 122X play a role in guiding sealed fluid into the first grooves 121X and discharging foreign matter to the side of the inner peripheral surface of the seal ring 100X. The first grooves 121X have a pair of dynamic pressure generation grooves 121Xa configured to have a groove bottom made shallower at their end in the circumferential direction than at their central part in the circumferential direction on both sides in the circumferential direction across a portion where the second grooves 122X enter (see FIGS. 26 and 27). In the present embodiment, the groove bottoms of the dynamic pressure generation grooves 121Xa are configured by planar inclined surfaces. However, the dynamic pressure generation grooves 121Xa are not limited to those exemplified in the figure, and various known arts can be employed so long as the dynamic pressure generation grooves 121Xa have the function of generating dynamic pressure when the sealed fluid is discharged from the grooves to the sliding part.

In addition, the first grooves 121X are provided at a position that falls within a sliding region S in which the seal ring 100X slides on the lateral wall surface 211 on the lower pressure side (L) (see FIG. 29). Accordingly, the sealed fluid is prevented from leaking from the first grooves 121X to the lower pressure side (L). Further, the groove bottoms of the second grooves 122X are configured to be deeper than the groove bottoms of the dynamic pressure generation grooves 121Xa. Thus, the second grooves 122 exhibit the function of guiding the sealed fluid into the first grooves 121 and discharging foreign matter intruding into the sliding part to the side of the inner peripheral surface of the seal ring 100X.

<Mechanism Where Seal Ring is in Use>

A mechanism where the seal ring 100X according to the present embodiment is in use will be described with particular reference to FIGS. 28 and 29. Since there is no differential pressure between the right and left regions as shown in FIG. 28 in a no-load state in which an engine is stopped, the seal ring 100X could be separated from a lateral wall surface on the left side in the figure of the annular groove 210 and the inner peripheral surface of the shaft hole of the housing 300.

FIG. 29 shows a state in which differential pressure has been generated via the seal ring 100X (pressure on the right side becomes higher than pressure on the left side in the figure) with the start of the engine. When the differential pressure is generated with the start of the engine, the seal ring 100X is brought into intimate contact with the lateral wall surface 211 on the lower pressure side (L) of the annular groove 210 and the inner peripheral surface of the shaft hole of the housing 300.

Thus, it becomes possible to seal the annular gap between the shaft 200 and the housing 300 that rotate relative to each other, to maintain the fluid pressure of the sealed region (a region on the higher pressure side (H)) in which the fluid pressure is configured to change. Further, when the shaft 200 and the housing 300 rotate relative to each other, the seal ring 100X slides on the lateral wall surface 211 on the lower pressure side (L) of the annular groove 210. Further, dynamic pressure is generated when sealed fluid flows out to the sliding part from the dynamic pressure generation grooves 121Xa provided on the lateral surface on the side of the sliding surface of the seal ring 100X. Note that when the seal ring 100X rotates in a clockwise direction in FIG. 21 relative to the annular groove 210, the sealed fluid flows out to the sliding part from the ends in a counterclockwise direction of the dynamic pressure generation grooves 121Xa. In addition, when the seal ring 100X rotates in the counterclockwise direction in FIG. 21 relative to the annular groove 210, the sealed fluid flows out to the sliding part from the ends in the clockwise direction of the dynamic pressure generation grooves 121Xa.

<Excellent Point of Seal Ring According to Present Embodiment>

In the seal ring 100X according to the present embodiment, sealed fluid is guided into the first grooves 121X and the second grooves 122X provided on the side of the sliding surface of the seal ring 100X. Therefore, in ranges in which the first grooves 121X and the second grooves 122X are provided, fluid pressure acting on the seal ring 100X from the higher pressure side (H) and fluid pressure acting on the seal ring 100X from the lower pressure side (L) cancel each other. Thus, the pressure receiving area of the seal ring 100X to receive the fluid pressure (the fluid pressure from the higher pressure side (H) to the lower pressure side (L)) can be reduced. In addition, when the seal ring 100X slides on the lateral wall surface 211 on the lower pressure side (L) of the annular groove 210, the sealed fluid flows out from the dynamic pressure generation grooves 121Xa to the sliding part to generate dynamic pressure. Thus, a force is generated in the seal ring 100X in a direction away from the lateral wall surface 211. Further, since the dynamic pressure generation grooves 121Xa are configured to have a groove bottom made shallower at their end in the circumferential direction than at their center in the circumferential direction, the above dynamic pressure can be effectively generated by a wedge effect.

As described above, the reduction in the pressure receiving area and the generation of the force in the seal ring 100X in the direction away from the lateral wall surface 211 due to the dynamic pressure work together. Thus, it becomes possible to effectively reduce a rotational torque. Since the reduction in the rotational torque (sliding torque) can be realized like this, heat generation due to the sliding can be prevented. Under high speed and high pressure conditions, it becomes possible to suitably use the seal ring 100X according to the present embodiment. As a result, a soft material such as aluminum can be used as the material of the shaft 200. In addition, since the dynamic pressure generation grooves are provided on both sides in the circumferential direction across a portion where the second grooves 122X enter, the dynamic pressure generation grooves can exhibit a dynamic pressure generation function regardless of the rotating direction of the seal ring 100X relative to the shaft 200.

In addition, since the first grooves 121X are provided at the position that falls within the sliding region S in which the seal ring 100X slides on the lateral wall surface 211, the amount of the sealed fluid leaking from the first grooves 121X can be suppressed. Moreover, the second grooves 122X having the bottom deeper than the groove bottoms of the dynamic pressure generation grooves 121Xa are provided. By the second grooves 122X, foreign matter intruding into the sliding part can be discharged to the side of the inner peripheral surface. Accordingly, the impairment of the dynamic pressure generation function of the dynamic pressure generation grooves 121Xa due to foreign matter is prevented. That is, foreign matter can be prevented from being put between the dynamic pressure generation grooves 121Xa and the lateral wall surface 211. Thus, a reduction in dynamic pressure effect can be prevented, and the acceleration of wear-out can be prevented.

Hereinafter, more specific examples (eleventh to fifteenth examples) of the first grooves 121X and the second grooves 122X will be described.

Eleventh Example

Figure 30:
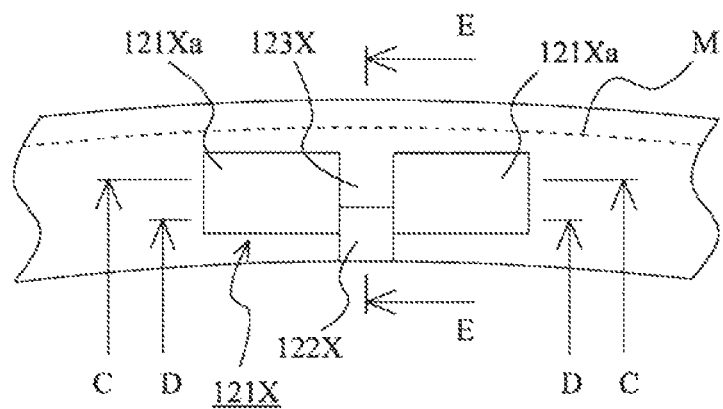
FIG. 30 is a partially enlarged view of the side view of a seal ring according to an eleventh example of the present disclosure.
Figure 31:
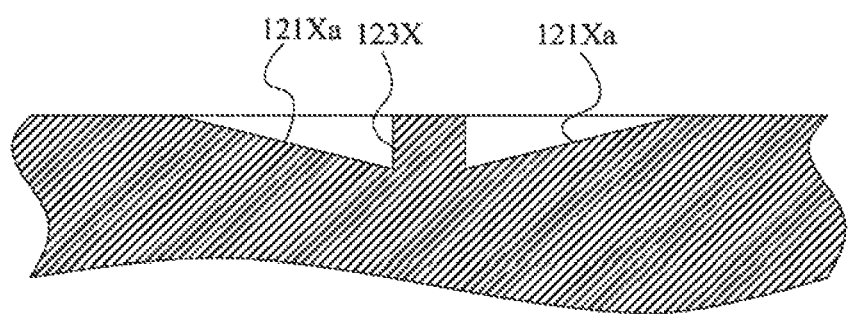
FIG. 31 is a schematic cross-sectional view of the seal ring according to the eleventh example of the present disclosure.
Figure 32:
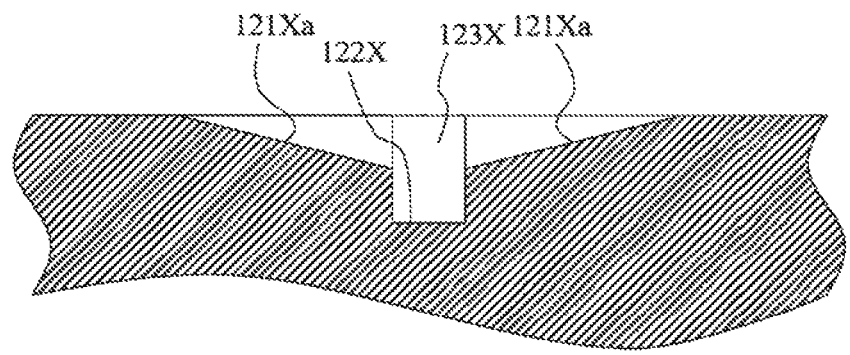
FIG. 32 is a schematic cross-sectional view of the seal ring according to the eleventh example of the present disclosure.
Figure 33:
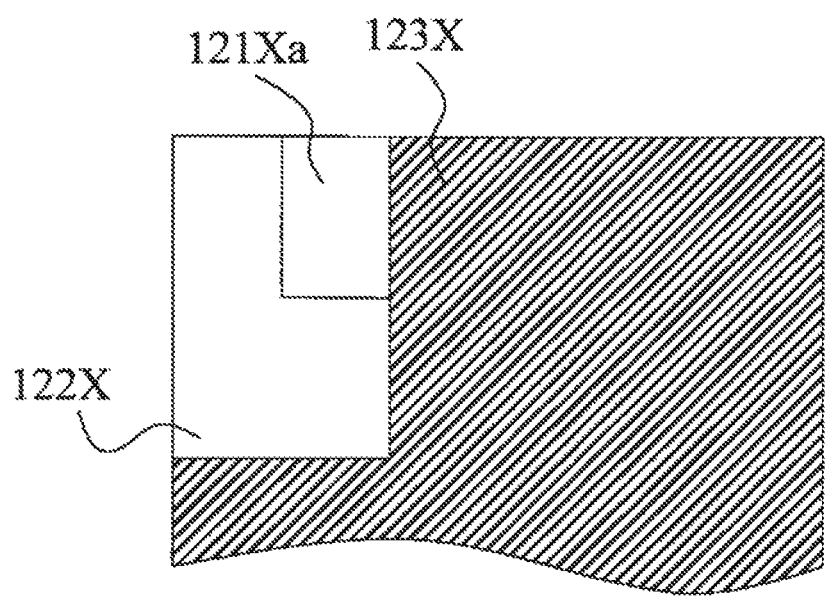
FIG. 33 is a schematic cross-sectional view of the seal ring according to the eleventh example of the present disclosure.

A first groove 121X and a second groove 122X according to an eleventh example of the present disclosure will be described with reference to FIGS. 30 to 33. FIG. 30 is a partially enlarged view of the side view of a seal ring according to the eleventh example of the present disclosure in which the vicinities of the first groove 121X and the second groove 122X are enlarged. FIG. 31 is a schematic cross-sectional view of the seal ring according to the eleventh example of the present disclosure in which a C-C cross-section in FIG. 30 is shown. FIG. 32 is a schematic cross-sectional view of the seal ring according to the eleventh example of the present disclosure in which a D-D cross-section in FIG. 30 is shown. FIG. 33 is a schematic cross-sectional view of the seal ring according to the eleventh example of the present disclosure in which an E-E cross-section in FIG. 30 is shown.

As described in the above second embodiment, the seal ring 100X has the first groove 121X extending in a circumferential direction and the second groove 122X extending from the inner peripheral surface of the seal ring 100X to a position at which the second groove 122X enters a central position of the first groove 121X in the circumferential direction. In the present example, a pair of dynamic pressure generation grooves 121Xa of the first groove 121X is configured to have a constant width in a radial direction. Further, between the pair of dynamic pressure generation grooves 121Xa and on an outside in the radial direction of the second groove 122X, a barrier part 123X that prevents sealed fluid from flowing from one of the dynamic pressure generation grooves 121Xa to the other of the dynamic pressure generation grooves 121Xa is provided. The surface of the barrier part 123X is flush with the lateral surface (excluding parts at which the first groove 121X and the second groove 122X are provided) of the seal ring 100X.

By the first groove 121X and the second groove 122X according to the present example configured as described above, the functions and effects described in the above second embodiment can be obtained. In addition, in the present example, fluid flowing from one of the dynamic pressure generation grooves 121Xa to the other of the dynamic pressure generation grooves 121Xa is easily flowed by the barrier part 123X to move to an inside in the radial direction of the second groove 122X. That is, when the seal ring 100X rotates in a counterclockwise direction in FIG. 30 relative to the annular groove 210, the fluid flowing from the dynamic pressure generation groove 121Xa on the left side to the dynamic pressure generation groove 121Xa on the right side in the figure is blocked by the barrier part 123X and easily flowed to move to the inside in the radial direction of the second groove 122X. Further, when the seal ring 100X rotates in a clockwise direction in FIG. 30 relative to the annular groove 210X, the fluid flowing from the dynamic pressure generation groove 121Xa on the right side to the dynamic pressure generation groove 121Xa on the left side in the figure is blocked by the barrier part 123X and easily flowed to move to the inner side in the radial direction of the second groove 122X. Thus, foreign matter intruding into the sliding surface is actively discharged to the side of the inner peripheral surface of the seal ring 100X.

Twelfth Example

Figure 34:
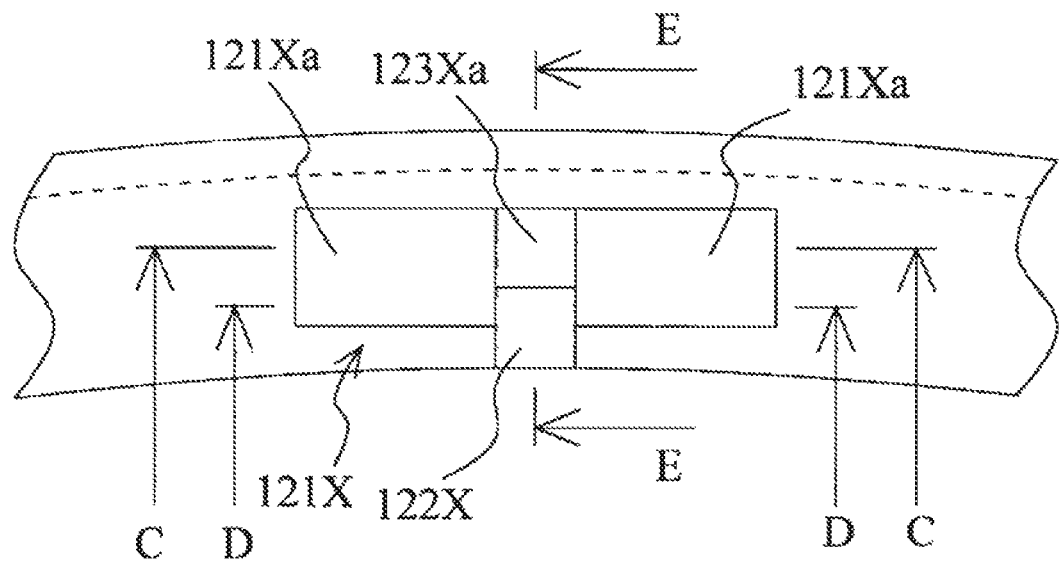
FIG. 34 is a partially enlarged view of the side view of a seal ring according to a twelfth example of the present disclosure.
Figure 35:
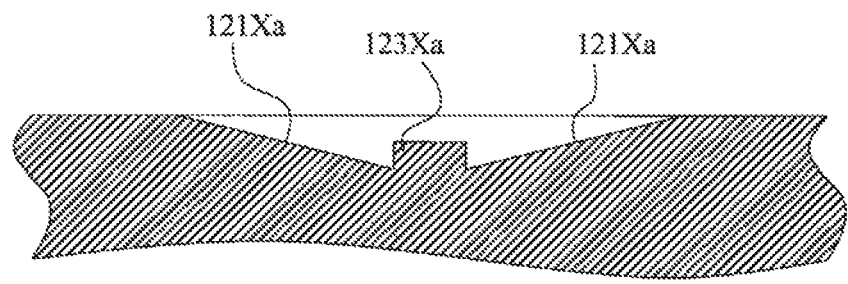
FIG. 35 is a schematic cross-sectional view of the seal ring according to the twelfth example of the present disclosure.
Figure 36:
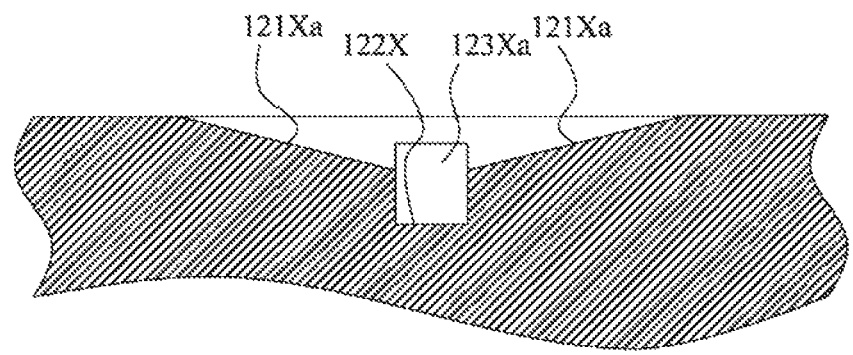
FIG. 36 is a schematic cross-sectional view of the seal ring according to the twelfth example of the present disclosure.
Figure 37:
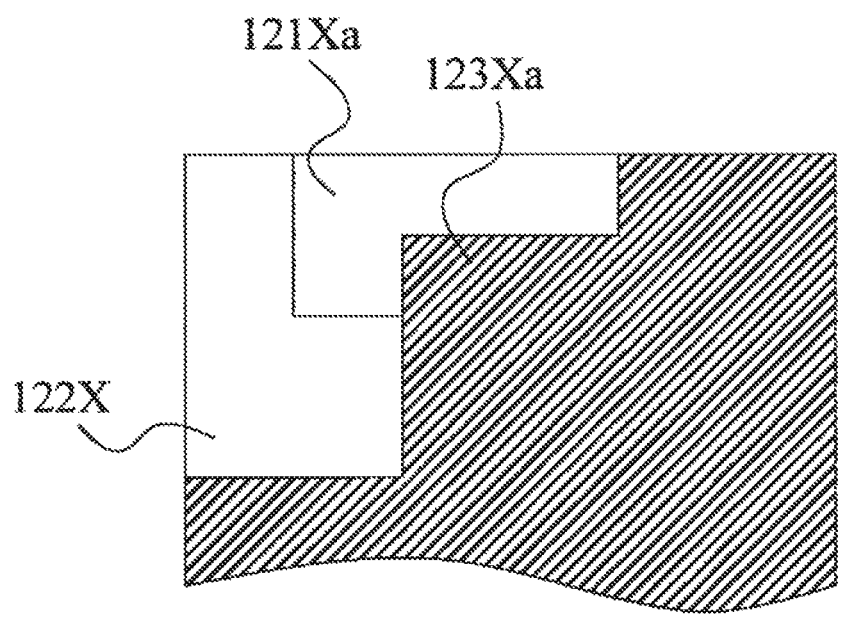
FIG. 37 is a schematic cross-sectional view of the seal ring according to the twelfth example of the present disclosure.

A first groove 121X and a second groove 122X according to a twelfth example of the present disclosure will be described with reference to FIGS. 34 to 37. FIG. 34 is a partially enlarged view of the side view of a seal ring according to the twelfth example of the present disclosure in which the vicinities of the first groove 121X and the second groove 122X are enlarged. FIG. 35 is a schematic cross-sectional view of the seal ring according to the twelfth example of the present disclosure in which a C-C cross-section in FIG. 34 is shown. FIG. 36 is a schematic cross-sectional view of the seal ring according to the twelfth example of the present disclosure in which a D-D cross-section in FIG. 34 is shown. FIG. 37 is a schematic cross-sectional view of the seal ring according to the twelfth example of the present disclosure in which an E-E cross-section in FIG. 34 is shown.

Like the eleventh example, the seal ring 100X has, on the side of its sliding surface, the first groove 121X extending in a circumferential direction and the second groove 122X extending from the inner peripheral surface of the seal ring 100X to a position at which the second groove 122X enters a central position of the first groove 121X in the circumferential direction in the present example as well. In addition, a pair of dynamic pressure generation grooves 121Xa of the first groove 121X is configured to have a constant width in a radial direction in the present example as well. Further, between the pair of dynamic pressure generation grooves 121Xa and on an outside in the radial direction of the second groove 122X, a barrier part 123Xa that prevents sealed fluid from flowing from one of the dynamic pressure generation grooves 121Xa to the other of the dynamic pressure generation grooves 121Xa is provided. The barrier part 123Xa in the present example is configured to be lower in height than the barrier part 123X in the eleventh example. That is, the surface of the barrier part 123Xa in the present example is positioned to be on the slightly inner side of the lateral surface (excluding parts at which the first groove 121X and the second groove 122X are provided) of the seal ring 100X.

By the first groove 121X and the second groove 122X according to the present example configured as described above, the same functions and effects as those of the above eleventh example can be obtained.

Thirteenth Example

Figure 38:
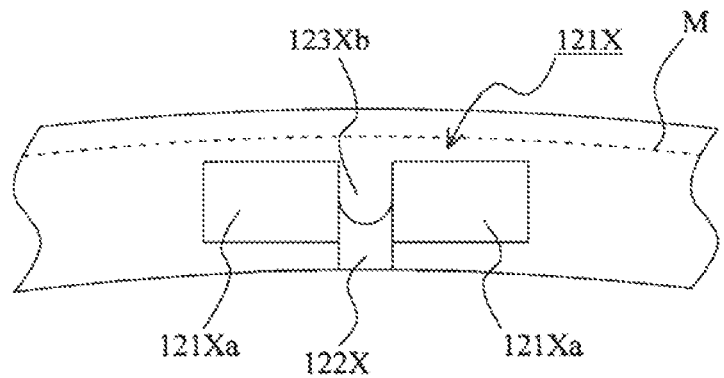
FIG. 38 is a partially enlarged view of the side view of a seal ring according to a thirteenth example of the present disclosure.

A first groove 121X and a second groove 122X according to a thirteenth example of the present disclosure will be described with reference to FIG. 38. FIG. 38 is a partially enlarged view of the side view of a seal ring according to the thirteenth example of the present disclosure in which the vicinities of the first groove 121X and the second groove 122X are enlarged.

Like the eleventh example, the seal ring 100X has, on the side of its sliding surface, the first groove 121X extending in a circumferential direction and the second groove 122X extending from the inner peripheral surface of the seal ring 100X to a position at which the second groove 122X enters a central position of the first groove 121X in the circumferential direction in the present example as well. In addition, a pair of dynamic pressure generation grooves 121Xa of the first groove 121X is configured to have a constant width in a radial direction in the present example as well. Further, between the pair of dynamic pressure generation grooves 121Xa and on an outside in the radial direction of the second groove 122X, a barrier part 123Xb that prevents sealed fluid from flowing from one of the dynamic pressure generation grooves 121Xa to the other of the dynamic pressure generation grooves 121Xa is provided. The barrier part 123Xb in the present example is configured to have a curved inner peripheral surface. Like this, the thirteenth example is different from the above eleventh example only in that the barrier part 123Xb is configured to have the curved inner peripheral surface.

By the first groove 121X and the second groove 122X according to the present example configured as described above, the same functions and effects as those of the above eleventh example can be obtained. Note that since the barrier part 123Xb is configured to have the curved inner peripheral surface, the flow of fluid from the dynamic pressure generation grooves 121Xa to the second groove 122X can be smoothened.

Fourteenth Example

Figure 39:
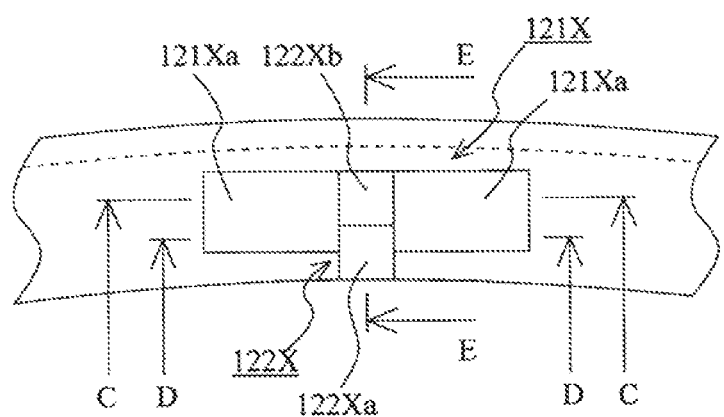
FIG. 39 is a partially enlarged view of the side view of a seal ring according to a fourteenth example of the present disclosure.
Figure 40:
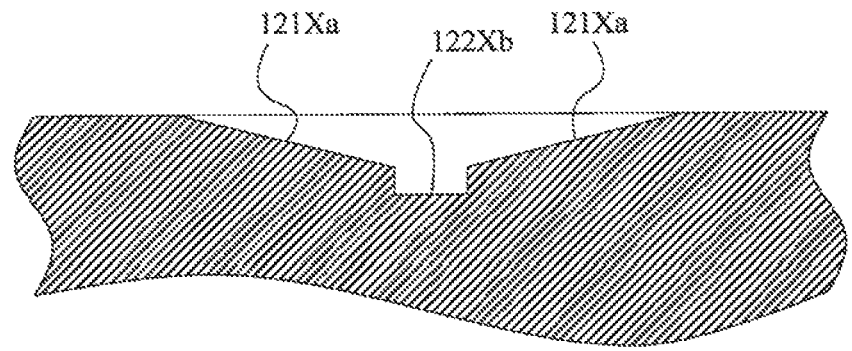
FIG. 40 is a schematic cross-sectional view of the seal ring according to the fourteenth example of the present disclosure.
Figure 41:
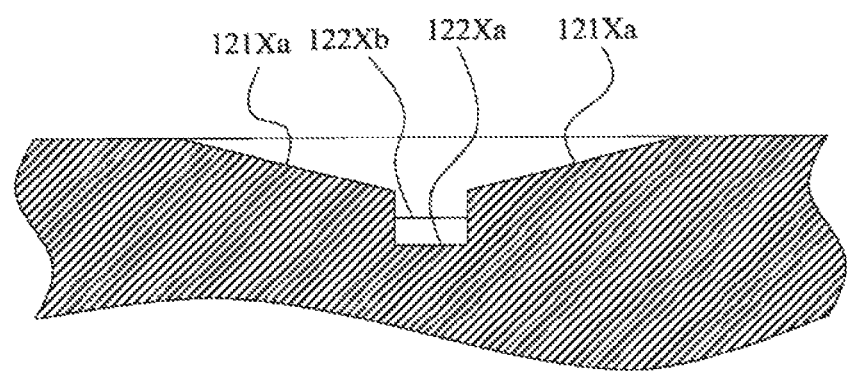
FIG. 41 is a schematic cross-sectional view of the seal ring according to the fourteenth example of the present disclosure.
Figure 42:
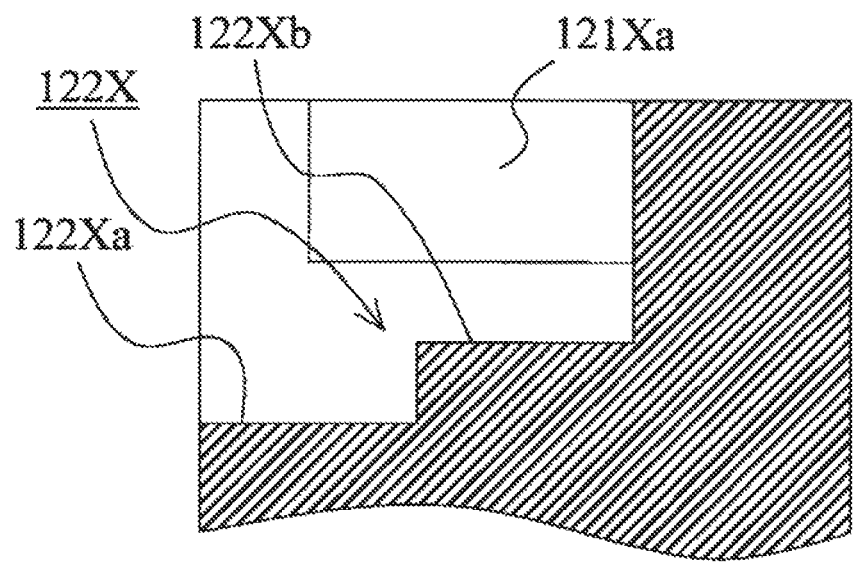
FIG. 42 is a schematic cross-sectional view of the seal ring according to the fourteenth example of the present disclosure.

A first groove 121X and a second groove 122X according to a fourteenth example of the present disclosure will be described with reference to FIGS. 39 to 42. FIG. 39 is a partially enlarged view of the side view of a seal ring according to the fourteenth example of the present disclosure in which the vicinities of the first groove 121X and the second groove 122X are enlarged. FIG. 40 is a schematic cross-sectional view of the seal ring according to the fourteenth example of the present disclosure in which a C-C cross-section in FIG. 39 is shown. FIG. 41 is a schematic cross-sectional view of the seal ring according to the fourteenth example of the present disclosure in which a D-D cross-section in FIG. 39 is shown. FIG. 42 is a schematic cross-sectional view of the seal ring according to the fourteenth example of the present disclosure in which an E-E cross-section in FIG. 39 is shown.

As described in the above second embodiment, the seal ring 100X has, on the side of its sliding surface, the first groove 121X extending in a circumferential direction and the second groove 122X extending from the inner peripheral surface of the seal ring 100X to a position at which the second groove 122X enters a central position of the first groove 121X in the circumferential direction. In the present example, a pair of dynamic pressure generation grooves 121Xa of the first groove 121X is configured to have a constant width in a radial direction. Further, the groove bottom of the second groove 122X according to the present example is configured by a stepped surface having a groove depth made greater from an outside to an inside in the radial direction. More specifically, the groove bottom of the second groove 122X is configured by two stepped surfaces with a groove bottom surface 122Xa on the inside in the radial direction and a groove bottom surface 122Xb on the outside in the radial direction. Further, the groove bottom surface 122a on the inside in the radial direction is configured to be deeper than the groove bottom surface 122Xb on the outside in the radial direction. Note that although the present example describes the case in which the groove bottom of the second groove 122X is configured by the two stepped surfaces, the groove bottom of the second groove 122X may be configured by three or more stepped surfaces.

By the first groove 121X and the second groove 122X according to the present example configured as described above, the functions and effects described in the above embodiment can be obtained. In addition, since the groove bottom of the second groove 122X is configured by the stepped surface having the groove depth made greater from the outside to the inside in the radial direction in the present example, foreign matter intruding into the second groove 122X can be actively discharged to the side of the inner peripheral surface of the seal ring 100X.

Fifteenth Example

Figure 43:
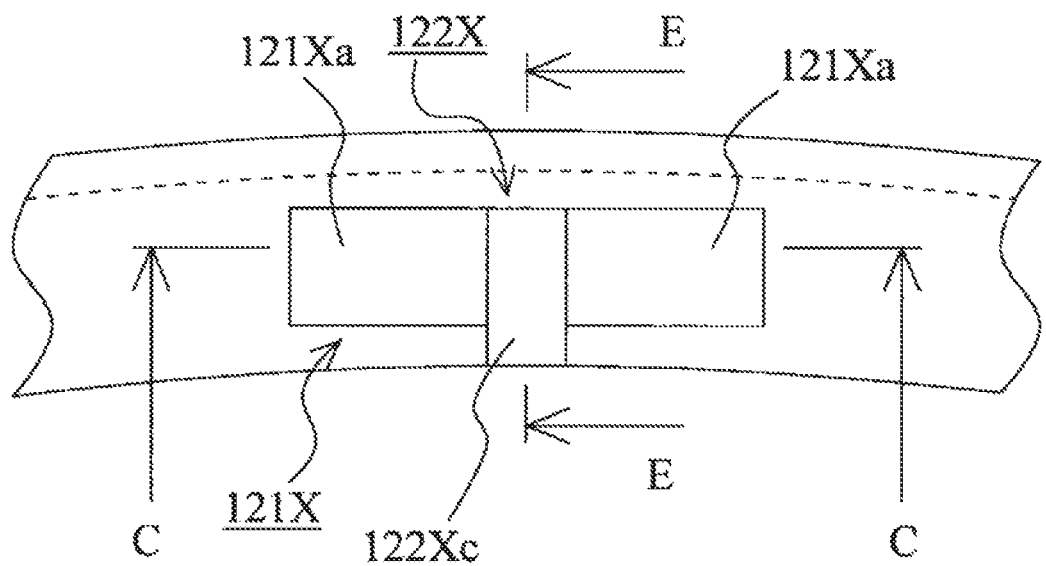
FIG. 43 is a partially enlarged view of the side view of a seal ring according to a fifteenth example of the present disclosure.
Figure 44:
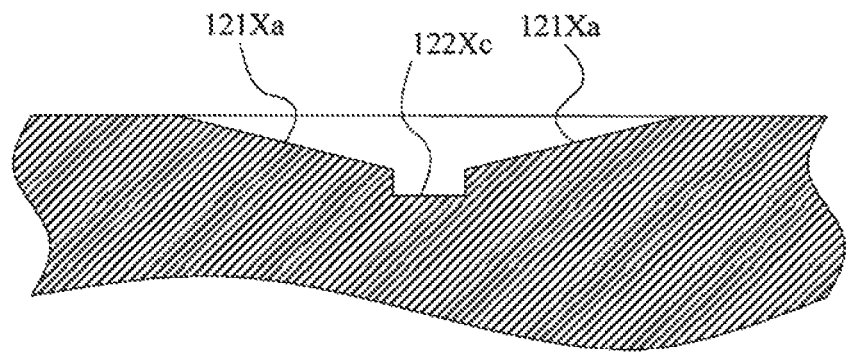
FIG. 44 is a schematic cross-sectional view of the seal ring according to the fifteenth example of the present disclosure.
Figure 45:
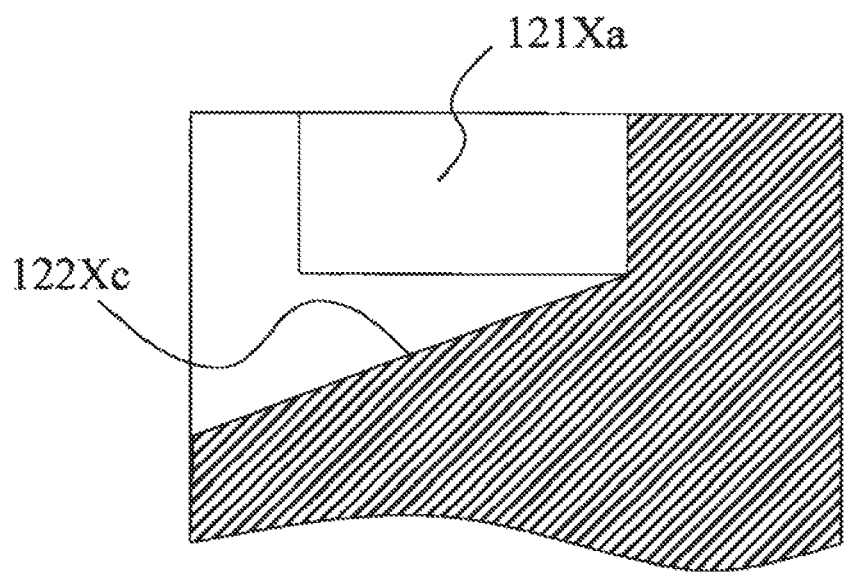
FIG. 45 is a schematic cross-sectional view of the seal ring according to the fifteenth example of the present disclosure.
Figure 46:
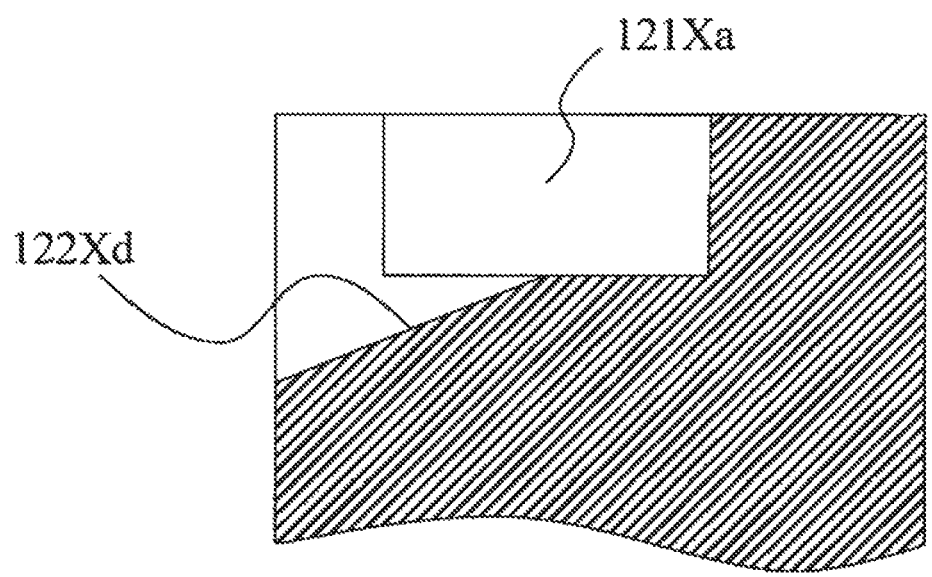
FIG. 46 is a schematic cross-sectional view of a seal ring according to a modified example of the fifteenth example of the present disclosure.

A first groove 121X and a second groove 122X according to a fifteenth example of the present disclosure will be described with reference to FIGS. 43 to 46. FIG. 43 is a partially enlarged view of the side view of a seal ring according to the fifteenth example of the present disclosure in which the vicinities of the first groove 121X and the second groove 122X are enlarged. FIG. 44 is a schematic cross-sectional view of the seal ring according to the fifteenth example of the present disclosure in which a C-C cross-section in FIG. 43 is shown. FIG. 45 is a schematic cross-sectional view of the seal ring according to the fifteenth example of the present disclosure in which an E-E cross-section in FIG. 43 is shown. FIG. 46 is a schematic cross-sectional view of a seal ring according to a modified example of the fifteenth example of the present disclosure.

As described in the above second embodiment, the seal ring 100X has, on the side of its sliding surface, the first groove 121X extending in a circumferential direction and the second groove 122X extending from the inner peripheral surface of the seal ring 100X to a position at which the second groove 122X enters a central position of the first groove 121X in the circumferential direction. In the present example, a pair of dynamic pressure generation grooves 121Xa of the first groove 121X is configured to have a constant width in a radial direction. Further, the groove bottom of the second groove 122X according to the present example is configured by an inclined surface 122Xc made deeper from an outside to an inside in the radial direction.

By the first groove 121X and the second groove 122X according to the present example configured as described above, the functions and effects described in the above second embodiment can be obtained. In addition, since the groove bottom of the second groove 122X is configured by an inclined surface 122Xc having a groove depth made greater from the outside to the inside in the radial direction, foreign matter intruding into the second groove 122X can be actively discharged to the side of the inner peripheral surface of the seal ring 100X.

Note that although the present example describes the case in which the entire groove bottom of the second groove 122X is configured by the inclined surface, for example, the surface on the outside in the radial direction of the groove bottom of the second groove 122X can be configured by a plane surface and the surface on the inside in the radial direction thereof can be configured by an inclined surface 122Xd made deeper from the outside to the inside in the radial direction, as in the modified example shown in FIG. 46. In this case as well, the same effects can be obtained.

Other

Although the above respective eleventh to fourteenth examples describe the cases in which the groove bottoms of the dynamic pressure generation grooves 121Xa are configured by the planar inclined surfaces, the groove bottoms of the dynamic pressure generation grooves 121Xa may be configured by curved inclined surfaces expanding to the side of the inner peripheral surface or the side of the outer peripheral surface. In addition, the first groove 121X and the second groove 122X may be provided only on one surface or both surfaces of the seal ring 100X. In short, a surface on which the first groove 121X and the second groove 122X are provided may only be required to serve as a sliding surface.

REFERENCE SIGNS LIST

100 Seal ring
110 Abutment joint part
111 First fitting convex part
112 Second fitting convex part
113 Second fitting concave part
114 First fitting concave part
115 End surface
116 End surface
120 Groove part
121 First groove
121a Dynamic pressure generation groove
121b Foreign matter catching groove
122 Second groove
200 Shaft
210 Annular groove
211 Lateral wall surface
300 Housing
X Sliding region
100X Seal ring
110X Abutment joint part
111X First fitting convex part
112X Second fitting convex part
113X Second fitting concave part
114X First fitting concave part
115X End surface
116X End surface
121X First groove
121Xa Dynamic pressure generation groove
122X Second groove
122Xa Groove bottom surface
122Xb Groove bottom surface
122Xc Inclined surface
122Xd Incline surface
123X, 123Xa, 123Xb Barrier part
S Sliding region

The invention claimed is:

1. A seal ring that is attached to an annular groove provided on an outer periphery of a shaft and seals an annular gap between the shaft and a housing that rotate relative to each other, to maintain fluid pressure in a sealed region in which the fluid pressure is configured to change,
the seal ring sliding on a lateral wall surface of the annular groove on a lower pressure side,
the seal ring comprising, on a side of a sliding surface thereof that slides on the lateral wall surface,
a first groove provided at a position that falls within a sliding region in which the seal ring slides on the lateral wall surface, and extending in a circumferential direction thereof, and
a second groove extending from an inner peripheral surface to a position at which the second groove enters a central position of the first groove in the circumferential direction, guiding sealed fluid into the first groove, and capable of discharging foreign matter to a side of the inner peripheral surface,
the first groove having a pair of dynamic pressure generation grooves configured to have a groove bottom made shallower at an end thereof in the circumferential direction than at a center thereof in the circumferential direction on both sides in the circumferential direction across a portion where the second groove enters,
the second groove being configured to have a groove bottom deeper than the groove bottoms of the dynamic pressure generation grooves, and
a barrier part defining a projection that extends radially inward from an outer circumferential wall of the first groove toward the second groove and between the pair of dynamic pressure generation grooves for controlling flow of sealed fluid from one of the dynamic pressure generation grooves to the other of the dynamic pressure generation grooves.

2. The seal ring according to claim 1, wherein the groove bottom of the second groove is configured by a stepped surface having a groove depth made greater from an outside to an inside in a radial direction.

3. The seal ring according to claim 1, wherein the groove bottom of the second groove is provided with an inclined surface having a groove depth made greater from an outside to an inside in a radial direction.

* * * * *